United States Patent
Pratt et al.

(10) Patent No.: US 9,292,328 B2
(45) Date of Patent: Mar. 22, 2016

(54) MANAGEMENT OF SUPERVISOR MODE EXECUTION PROTECTION (SMEP) BY A HYPERVISOR

(71) Applicant: Bromium, Inc., Cupertino, CA (US)

(72) Inventors: Ian Pratt, Cambridge (GB); Rafal Wojtczuk, Warszawa (PL)

(73) Assignee: Bromium, Inc., Cupertino, CA (US)

( * ) Notice: Subject to any disclaimer, the term of this patent is extended or adjusted under 35 U.S.C. 154(b) by 171 days.

(21) Appl. No.: 13/902,617

(22) Filed: May 24, 2013

(65) Prior Publication Data

US 2014/0351810 A1  Nov. 27, 2014

(51) Int. Cl.
 *G06F 9/455*  (2006.01)
(52) U.S. Cl.
 CPC ................................. *G06F 9/45545* (2013.01)
(58) Field of Classification Search
 CPC .................................................. G06F 9/45545
 See application file for complete search history.

(56) References Cited

U.S. PATENT DOCUMENTS

| | | | |
|---|---|---|---|
| 6,948,044 B1 | 9/2005 | Chandrasekaran | |
| 7,171,523 B2 | 1/2007 | Yamasaki | |
| 8,146,084 B1 | 3/2012 | Meketa | |
| 8,346,727 B1 | 1/2013 | Chester et al. | |
| 8,543,641 B2 | 9/2013 | Cherukuri et al. | |
| 8,949,498 B2 * | 2/2015 | Kagan | 710/262 |
| 2004/0128670 A1 | 7/2004 | Robinson et al. | |
| 2005/0149726 A1 | 7/2005 | Joshi et al. | |
| 2006/0101189 A1 | 5/2006 | Chandrasekaran et al. | |
| 2006/0136910 A1 | 6/2006 | Brickell et al. | |
| 2006/0143617 A1 | 6/2006 | Knauerhase et al. | |
| 2006/0184937 A1 | 8/2006 | Abels et al. | |
| 2006/0288343 A1 | 12/2006 | Pallister | |
| 2007/0180450 A1 | 8/2007 | Croft et al. | |
| 2007/0192329 A1 | 8/2007 | Croft et al. | |
| 2008/0001958 A1 | 1/2008 | Vembu et al. | |
| 2009/0007242 A1 | 1/2009 | Subramanian et al. | |
| 2009/0119541 A1 | 5/2009 | Inoue et al. | |
| 2009/0165133 A1 | 6/2009 | Hwang et al. | |

(Continued)

FOREIGN PATENT DOCUMENTS

WO  2008073618 A2  6/2008

OTHER PUBLICATIONS

Altaher, Altyeb, Sureswaran Ramadass, and Ammar Ali. "Computer virus detection using features ranking and machine learning." Australian Journal of Basic and Applied Sciences 5.9 (2011): 1482-1486.*

(Continued)

*Primary Examiner* — Emerson Puente
*Assistant Examiner* — Charlie Sun
(74) *Attorney, Agent, or Firm* — Brokaw Patent Law PC; Christopher J. Brokaw

(57) ABSTRACT

Approaches for enabling Supervisor Mode Execution Protection (SMEP) for a guest operating system which does not support SMEP. A guest operating system (OS), which does not support SMEP, is executed within a virtual machine. A hypervisor instructs hardware to enable SMEP for the virtual machine executing the guest operating system. When the hypervisor is notified that the hardware has detected the guest operating system instructing a central processing unit (CPU) to execute code stored in virtual memory accessible by user space while the CPU is in supervisor mode, the hypervisor may consult a policy to identify what, if any, responsive action the hypervisor should perform.

24 Claims, 12 Drawing Sheets

(56) References Cited

U.S. PATENT DOCUMENTS

| | | |
|---|---|---|
| 2009/0172820 A1 | 7/2009 | Watson |
| 2009/0249472 A1 | 10/2009 | Litvin et al. |
| 2009/0276783 A1 | 11/2009 | Johnson et al. |
| 2009/0313620 A1 | 12/2009 | Sedukhin et al. |
| 2009/0328033 A1 | 12/2009 | Kohavi et al. |
| 2010/0122343 A1 | 5/2010 | Ghosh et al. |
| 2010/0235831 A1 | 9/2010 | Dittmer |
| 2011/0035494 A1 | 2/2011 | Pandey et al. |
| 2011/0173251 A1 | 7/2011 | Sandhu et al. |
| 2011/0296487 A1 | 12/2011 | Walsh |
| 2011/0302577 A1 | 12/2011 | Reuther et al. |
| 2012/0089666 A1 | 4/2012 | Goswami et al. |
| 2013/0091568 A1* | 4/2013 | Sharif et al. ............. 726/22 |
| 2013/0263125 A1* | 10/2013 | Shamsee et al. ............ 718/1 |
| 2014/0143507 A1* | 5/2014 | Maria Joseph et al. ...... 711/147 |
| 2014/0157407 A1* | 6/2014 | Krishnan et al. ............. 726/22 |
| 2014/0282832 A1* | 9/2014 | Chanoch et al. ............. 726/1 |
| 2015/0033227 A1* | 1/2015 | Lin et al. .................. 718/1 |

OTHER PUBLICATIONS

Chhabra, Siddhartha, et al. "SecureME: a hardware-software approach to full system security." Proceedings of the international conference on Supercomputing. ACM, 2011.*

George, Varghese, Tom Piazza, and Hong Jiang. "Technology Insight: Intel® Next Generation Microarchitecture Codename Ivy Bridge." Intel Developer Forum. 2011.*

Fu, Yangchun, and Zhiqiang Lin. "Space traveling across vm: Automatically bridging the semantic gap in virtual machine introspection via online kernel data redirection." Security and Privacy (SP), 2012 IEEE Symposium on. IEEE, 2012.*

* cited by examiner

MANAGEMENT OF SUPERVISOR MODE EXECUTION PROTECTION (SMEP) BY A HYPERVISOR

RELATED APPLICATION DATA

This application is related to U.S. patent application Ser. No. 13/115,354, filed on May 25, 2011, entitled "Approaches for Securing an Endpoint Using Fine-Grained operation System Visualization," invented by Gaurav Banga et al., the disclosure of which is hereby incorporated by reference in its entirety for all purposes as if fully set forth herein.

This application is related to U.S. patent application Ser. No. 13/223,091, filed on Aug. 31, 2011, entitled "Approaches for Automated Management of Virtual Machines for Running Untrusted Code Safely," invented by Gaurav Banga et al., the disclosure of which is hereby incorporated by reference in its entirety for all purposes as if fully set forth herein.

This application is related to U.S. patent application Ser. No. 13/419,345, filed on Mar. 13, 2012, entitled "Seamless Management of Untrusted Data Using Virtual Machines," invented by Gaurav Banga et al., the disclosure of which is hereby incorporated by reference in its entirety for all purposes as if fully set forth herein.

This application is related to U.S. patent application Ser. No. 13/526,423, filed on Jun. 18, 2012, entitled "Securing Resources of a Virtual Machine," invented by Deepak Khajura et al., the disclosure of which is hereby incorporated by reference in its entirety for all purposes as if fully set forth herein.

FIELD OF THE INVENTION

Embodiments of the invention relate to supporting Supervisor Mode Execution Protection (SMEP) in a virtualized computing environment.

BACKGROUND

The Intel x86 architecture supports a feature known as Supervisor Mode Execution Protection (SMEP). Each virtual address entry of a page table may indicate whether SMEP is enabled for that virtual address. When SMEP is enabled for a virtual address, if code stored at that virtual address is executed within a higher priority mode (or "Ring" as it is known in the technical parlance) than the priority associated with the code and data stored at the virtual address, then a fault is generated.

For example, the highest priority mode is commonly referred to as Ring 0. Ring 0 may also be referred to as kernel mode or supervisor mode. A lower priority mode is Ring 3, which is also known as user mode. When a user stores code or data in memory, the stored code or data is designated Ring 3. When the CPU is in the highest priority mode (and therefore has privilege to update any data on the machine), the CPU should not be executing the code or data stored by the user, since the user could have stored anything at that location, including malicious code. Therefore, the SMEP feature is designed to protect the computer system by throwing an exception if code or data designated at a lower priority (for example, Ring 3) is executed within a higher priority mode (for example, Ring 0). The exception thrown may be processed by the operating system, and will typically result in the operating system crashing, since there is no good reason for the operating system to be executing code or data designated as accessible in Ring 3 while in Ring 0.

Operating systems which execute on the x86 architecture may, but need not, support SMEP. For example, currently Microsoft Windows 8 provides support for SMEP whereas Microsoft Windows 7 does not.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for supporting Supervisor Mode Execution Protection (SMEP) in a virtualized computing environment are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments of the invention provide approaches for enabling Supervisor Mode Execution Protection (SMEP) for a guest operating system which does not support SMEP. In one embodiment, a guest operating system (OS), which does not support SMEP, is executed within a virtual machine. A hypervisor may instruct hardware, such as the Intel x86 architecture for example, to enable SMEP for a virtual machine in which the guest operating system executes. When the hypervisor is notified that the hardware has detected the guest operating system instructing a central processing unit (CPU) to execute code stored in virtual memory accessible by user space while the CPU is in supervisor mode, the hypervisor may consult a policy to identify what, if any, responsive action the hypervisor should perform.

The hypervisor may perform a variety of responsive actions based on policy. As but one example, the hypervisor may suppress the page fault and initiate forensic analysis upon activity performed within the virtual machine. As another example, the hypervisor may propagate a page fault to the guest operating system to cause the guest operating system to crash (i.e., cease execution). Alternately, the hypervisor may chose to close the virtual machine.

Additional embodiments are described below in the section entitled "Supporting SMEP in a Virtualized Environment." Prior to presenting this material, additional details will be presented about the architecture of certain exemplary contexts.

Architecture Overview

Figure 1:
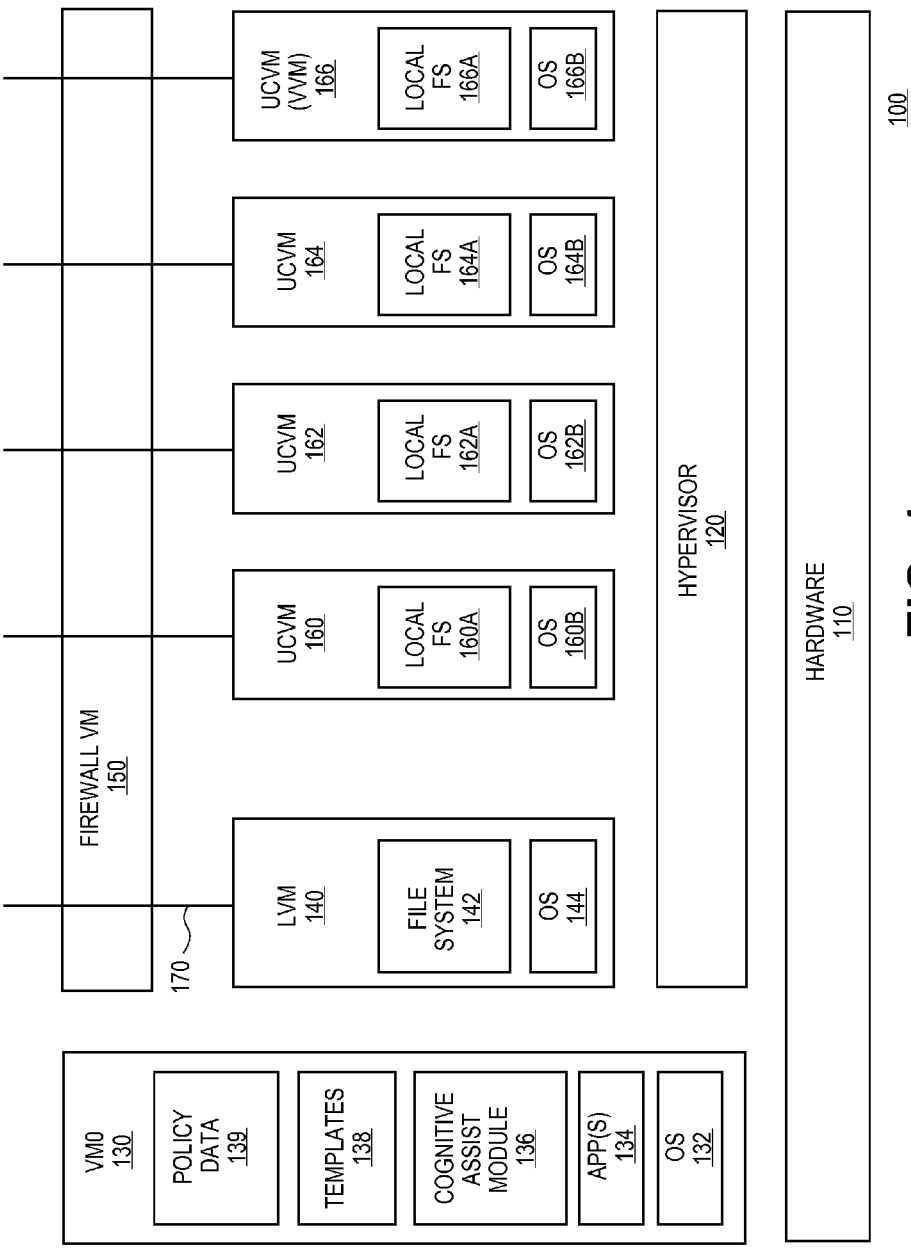
FIG. 1 is an block diagram of the functional components of one embodiment of the invention.

Embodiments of the invention may be implemented upon a computer system. A computer system of an embodiment includes a number of independent virtual machines (VMs) that each executes a full operating system (OS). A block diagram of client 100 according to one embodiment of the invention is shown in FIG. 1. The term "client," as broadly used herein, represents any type of Internet endpoint or computer system capable of connecting to a network and executing a virtual machine. Non-limiting, illustrative examples of client 100 include a PC, a laptop computer, a tablet computer, a cell phone, a personal digital assistant (PDA), and the like.

In an embodiment, client 100 may execute server software and therefore, may function as a server. Thus, while use of the term "client" in other contexts might exclude an interpretation that includes a server, as broadly used herein, client 100 may be embodied on a wide variety of machines, one example of such being a machine which operates as a server. Thus, as the Applicant may be his or her own lexicographer, as used herein, the term client 100 expressly includes an embodiment where client 100 embodies a server. For example, non-limiting, illustrative examples of client 100 include a web server, an application server, a file server, and a cloud server. Indeed, implementing embodiments of the invention upon a server may yield many benefits. The micro-virtualization techniques employed by embodiments provide an efficient mechanism for eliminating the risk of executing potentially malicious code in accordance with different policies to manage such risk.

Client 100 includes a number of virtual machines (such as 130, 140, 150, and 160, for example) that execute on hardware 110 of client 100. The various VMs within client 100 may be used for separately executing processes associated with different activities. One such VM, namely "VM0" (i.e., VM0 130 of FIG. 1), is secured so that VM0 may serve as the root of trust with a guaranteed integrity. VM0 may contain core operating system 132 and one or more applications 134. In the embodiment shown in FIG. 1, VM0 is not accessible over any network, such as the Internet. As shall be explained below, VM0 provides a secure environment in which operating system 132 and one or more applications 134 may execute without risk of exposure to malicious code.

Other VMs, such as VMs 160, 162, 164, and 166 in FIG. 1, may be created, maintained, and destroyed on-demand using a very efficient micro-virtualizing hypervisor 120. Using efficient micro-virtualization techniques, the latency of starting and stopping activities or applications which run in their own VM in embodiments is very low, thereby providing a practical user experience while employing full OS virtualization.

In an embodiment, certain computing activity identified by policy may be performed in a separate VM by certain embodiments. The policy is designed to isolate any execution of code that may potentially be malicious within a virtual machine that is destroyed after its immediate use is ended, thereby preventing any malicious code from effecting any lasting change to the computer system.

The Trusted Virtual Machine—VM0

In an embodiment of the invention, a special virtual machine, referred to herein as "VM0," is created to be a trusted and secure portion of a computer system. FIG. 1 depicts VM0 130 according to an embodiment. VM0 130 may be (but need not be) permanently disconnected from any network (i.e., VM0 130 is not connected to any local network or the Internet). Specifically, VM0 130 may not contain any type of networking stack, such as a TCP/IP network stack, and may not have access to any networking hardware that could allow for communication between VM0 130 or any applications 134 executed thereby and the Internet. Thus, in such an embodiment, the only way to install software onto VM0 130 is to have physical custody of client 100 and manually install the software on VM0 130.

Thus, in certain embodiments, one or more applications 134 executing within VM0 130 do not have any access to a network, must be fully self contained in their functionality, and must rely only on local code and data for all their functionality. All applications that need to access the network will therefore need to run in a separate virtual machine outside of VM0 130, as shall be described in further detail below. It is envisioned that the software (such as one or more applications 134) running in VM0 130 be selected at the time client 100 is manufactured or first configured for use in a controlled environment. If VM0 130 is never connected to any type of network, such as a TCP/IP network, all common types of network initiated attacks cannot be waged against VM0 130, thereby rendering VM0 130 immune to such attacks and safe as compared to any computer or VM that is connected to the Internet.

In certain embodiments, VM0 130 may be implemented to execute on native hardware. In such an embodiment, VM0 130 would not be considered a virtual machine. Thus, while examples are discussed herein where VM0 130 is implemented as a virtual machine, other embodiments of the invention may embody VM0 130 not as a virtual machine, but instead, may execute VM0 130 on native hardware.

In an embodiment where hypervisor 120 is a Type 2 hypervisor, when client 100 is booted, only VM0 130 is started by the BIOS or firmware of client 100. Once VM0 130 is running, VM0 130 can start hypervisor 120 immediately or on demand. In another embodiment, where hypervisor 120 is a type 1 hypervisor, hypervisor 120 is first started by the BIOS when client 100 is booted and VM0 130 is launched by the Hypervisor 120. Hypervisor 120 is a software component that is responsible for creating other VMs which each execute independent instances of the operating system. These additional VMs are instantiated by VM0 130 and/or hypervisor 120 to run any untrusted code or code that needs to access the network. Untrusted code in this context is any code which has not been pre-approved as being trusted by an IT administrator of client 100. Note that the user's desktop may, but need not, run in VM0 130. If the user's desktop is not run within VM0 130, then it could be run within another VM, such as one specifically tailored to that task. The additional VMs are started "silently" and automatically by client 100, e.g., these VMs are started transparently to the user and without the user having to do anything explicit. These additional VMs are also not explicitly visible to the user; instead, all the user sees on the desktop is familiar objects (such as icons, windows, and applications) without any indication that multiple VMs are executing in client 100. Embodiments of the invention follow rules that govern what application activities are assigned to which particular VM. Additional examples of such rules are described below in greater detail.

In another embodiment (not depicted in FIG. 1), VM0 130 may have a networking stack that is firewalled off from the network using well-tested firewall software, thereby allowing VM0 130 to have access to a computer network. Such an embodiment may only allow connections with a specific Internet system so that the software inside VM0 130 may be updated from a designated update server. For example, the firewall software may only allow VM0 130 to connect to one or more servers associated with the IT administrator of client 100 and may prevent VM0 130 from establishing a connection with any other endpoint on any network. Thus, in certain embodiments, VM0 130 may have access to an Intranet but not to the Internet at large. Certain embodiments may restrict the network access of VM0 130 such that VM0 130 has access to a different set of network resources than other instantiated virtual machines.

Interaction with an User Interface

All code responsible for generating a user interface (UI) not associated with an application may be maintained in VM0 130. Consequently, all UI interaction activity with the desktop between a user and software executing on client 100 may take place between the user and VM0 130, which maintains a unified desktop for all applications running in all VMs. Interaction between the user and applications running in VMs other than VM0 130 takes place indirectly via VM0 130. For example, when the user enters a password for a web site whose browser and HTML/Javascript code is running in an untrusted VM, the password is first directly provided to VM0 130, which then transfers the information to an untrusted VM responsible for interacting with the web site. Furthermore, the untrusted VM's display is rendered on to a virtualized display, which is then composed into the VM0 130 desktop (as appropriate) by controlling code running in VM0 130. As code executing in VM0 130 is deemed safe by a policy, the user may trust any user interface controls displayed on a screen since all code responsible for rendering the user interface is deemed safe by the policy.

This approach is quite different from prior systems where often the integrity of code that controls the full desktop experience is untrusted or unverified. Consequently, if the code responsible for generating the user interface is corrupted by malware, then the user interface may be used as a tool to deceive the user. For example, malware may cause a user interface control to be displayed that requests the user to submit an authentication credential which will be used for improper purposes by the malware. However, this problem is overcome by embodiments of the invention—since all code responsible for rendering user interface controls executes in VM0 in an embodiment, malware is prevented from hijacking or corrupting UI-rendering code.

Figure 2:
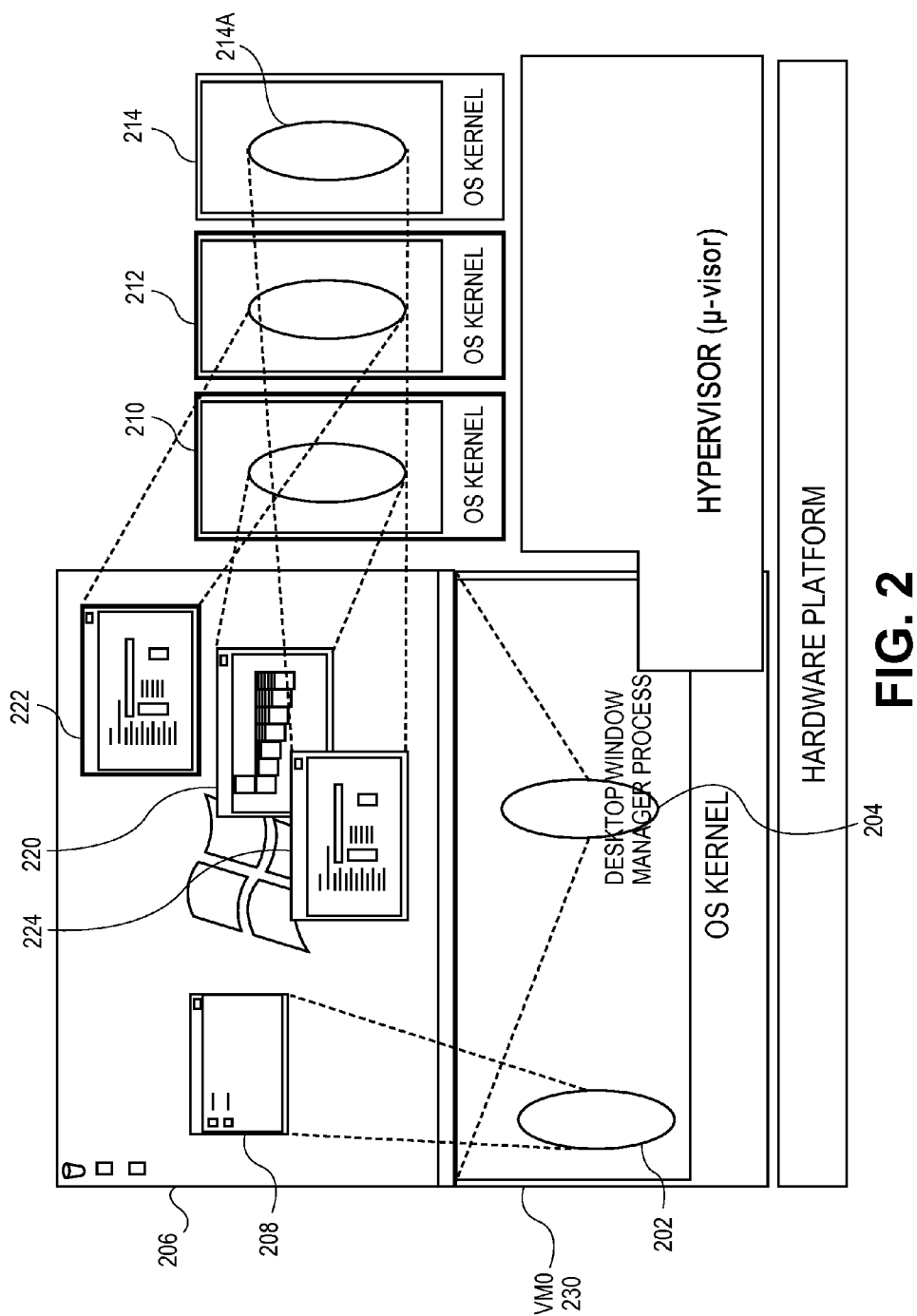
FIG. 2 is an illustration of exemplary desktop of a client according to an embodiment of the invention.

To illustrate an embodiment of the invention, consider FIG. 2, which is an illustration of exemplary desktop of client 100 according to an embodiment. As shown in FIG. 2, process 204 is responsible for rendering desktop 206 on a physical display of client 100. Process 214A runs in untrusted VM 214 and does not have complete access to the file system of client 100. When process 214A running inside VM 214 requests access to the file system of client 100, the request is intercepted and handled by VM0 230. For example, process 202 may be responsible for rendering a window 208 depicting the contents of the file system of client 100. Process 202 has the option of selectively determining which contents are available to VM 214 based on policies as set forth by the IT administrator or the user. Process 414A may generate the contents of a display window 424 to be shown on desktop 206 based on the information made available to it by processes 202.

VM 210 in FIG. 2 that runs the solitaire game shown in display window 220 is implemented such that the display of VM 210 is a virtualized display, which is then composed into the desktop 206 (as appropriate) by controlling process 204 running in VM0 130. Display windows 222 and 224, which depict content generated by processes running in VMs 212 and 214 respectively, are rendered on the desktop 206 in a similar fashion.

The Legacy Virtual Machine—LVM

FIG. 1 depicts a legacy virtual machine (LVM) 140 according to an embodiment of the invention. LVM 140 may serve as the primary entity being managed by the IT administrator of client 100. As such, LVM 140 provides an environment that is analogous to the managed enterprise OS of corporate computer system in that an IT department may install and maintain various enterprise applications within operating system 144 of LVM 140. Certain embodiments may not comprise a LVM 140, and as a result, the presence of LVM 140 is optional within embodiments of the invention.

LVM 140 may contain operating system 144. In an embodiment, operating system 144 of LVM 140 may correspond to a Microsoft Windows OS or any other general purpose OS such as Linux or MacOS.

In an embodiment, LVM 140 is responsible for storing the main file system 142 of client 100. File system 142 may contain the user's profile folder containing the user's settings and files.

LVM 140 typically only runs infrastructure OS programs and programs that are used for the purpose of managing client 100 and trusted enterprise applications. Other user programs (especially those that involve external components or consume untrusted data) do not run in LVM 140, but instead, run elsewhere in separate VMs (such as a UCVM as described in more detail below). In an embodiment, untrusted data refers to any data whose integrity has not been verified by a policy of an embodiment.

In an embodiment, the network access of LVM 140 is restricted to just the corporate network as implemented by firewall VM 150. Firewall VM 150 is a specialized virtual machine that comprises firewall software/applications to restrict network access of VMs running in client 100 to appropriate and/or necessary network access points. Such practice is consistent with the need for only the responsible IT administrator to be capable of connecting to LVM 140 to manage LVM 140 and processes executing therein.

In one embodiment, LVM 140 and VM0 130 may be implemented in a single virtual machine or as the same entity.

Untrusted Code Virtual Machine—UCVM

In an embodiment, when a user wishes to run any application that requires access to either a network or data originating from outside client 100, the application is run inside a dedicated VM that is created on-demand by hypervisor 120. This dedicated VM is called an Untrusted Code Virtual Machine (or "UCVM"). FIG. 1 depicts several UCVMs, namely UCVM 160, 162, 164, and 166. A UCVM operates under the assumption that, in general, any code that connects to the network and interacts with arbitrary code executing on an external device may at some point be compromised. This assumption also applies to trusted applications that interact with data originating from outside the computer system executing the trusted application, because such data may, at some point, contain embedded malicious code. To address such possibilities, such applications are executed in a UCVM to prevent any malicious code, inadvertently introduced into the UCVM, from having the capacity to affect any change outside of the UCVM.

In an embodiment, a UCVM is created by (a) cloning a copy of virtual machine having desired characteristics and (b) providing access to a restricted file system to the newly created UCVM. For example, UCVM 160 comprises restricted file system 160A, UCVM 162 comprises restricted file system 162A, and UCVM 164 comprises restricted file system 164A. Each UCVM possesses its own instance or copy of the operating system, which is isolated and separate from the main operating system (including its code and data) executing within VM0 130 or LVM 140. For example, UCVM 160 comprises operating system 160B, UCVM 162 comprises operating system 162B, and UCVM 164 comprises operating system 164B.

To provide a low latency user experience, UCVMs may not be booted from scratch each time an application is needed to be started. Instead, a UCVM may be created very quickly by cloning the UCVM from a template VM (with a booted OS) that has been pre-loaded in memory at system boot time. In an embodiment, the template used to clone a UCVM may be selected from templates 138 stored in VM0 130. A variety of techniques can be employed to make this cloning operation as fast as a few 100 milliseconds. Multiple types of templates may be used by a system to create UCVMs depending the nature and type of application(s) to be run inside the UCVM, as discussed in greater detail below in the section entitled "Cloning a UCVM from a Template."

Cognitive assist module 136 is software that is responsible for implementing the rules and policies of embodiments as well as helping the user of client 100 in understanding and navigating the security model employed by client 100 on an as-needed basis. Cognitive assist module 136 helps decide what activities run in which UCVMs, including when VMs are created or destroyed, and what kind of access to network and file system resources each UCVM has. Cognitive assist module 136 also helps protect the user, e.g., when a user is fooled by malware running in a UCVM and is in the process of providing some information that they have previously provided to enterprise code running in LVM 140 (for example a password), then cognitive assist module 136 may detect this situation and prevent the user from providing the information (which may be secret corporate information) to the malware.

Regarding the restricted file system of each UCVM, each UCVM has access to a private copy of a subset of the files in file system 142 on client 100. A UCVM may only have access to those files which the UCVM should need for the correct operation of the application executing therein. For example, user files are usually not required for correct operation of an application executing in a UCVM and thus are not typically exposed to a UCVM. On the other hand, if a UCVM is created as a result of the user wishing to edit a document using an application, such as MS Word, then a copy of the document the user wishes to edit will be provided to the restricted file system of the UCVM at the time the UCVM is created. Advantageously, using UCVM 160 as an example, if a process executing within UCVM 160 makes any changes to any files in restricted file system 160A, then these changes do not impact the files stored in file system 142 maintained in LVM 140 because such changes are only made to restricted file system 160A maintained in the UCVM and are not propagated, without express consent from the user, to file system 142 maintained by LVM 140.

In a typical use case of a UCVM, the UCVM may run a local application or an individual web page session. When a user is done running the local application or navigates away from a web page to another page with a different Internet URL domain, the corresponding UCVM is destroyed. Any new local application or web application will be run inside a brand new, separate UCVM that is cloned again from a clean UCVM master template. Thus, if there has been any compromise to the UCVM during the course of running some malicious code that was introduced into the UCVM, then the adverse affects of the security breach are isolated to only the affected UCVM and are lost when the UCVM is destroyed.

For example, assume that a user double-clicks on a MS Word document icon in Windows Explorer. Embodiments create a special UCVM to run the MS Word process. In a particular embodiment, cognitive assist module 136 of VM0 130 may dynamically create the UCVM using a template selected from one or more templates 138 or use a pre-existing template in memory or on the disk. The template selected by cognitive assist module 136 may be selected based on what activity is to occur within the UCVM, i.e., the selected may be designed to create a UCVM having characteristics that are optimal for running a text editor therein. The created UCVM contains a copy of the operating system as well as a restricted (local) copy of the file system. This local copy of the file system in the UCVM contains all the usual Windows and Program files; however, the user's profile folder in the local copy of the file system contains only the single target MS Word document being opened.

As another example, assume that three tabs are open in a web browser and further assume that each tab displays a different web page. In consideration of the code which may be contained or embedded on a web page, each web page may be properly considered a web application. In embodiments of the invention, the code responsible for rendering the user interface (UI) of the web browser runs in VM0 130. On the other hand, executable code for the three web applications runs in three separate UCVMs. A core HTML/Javascript engine runs in each of the three UCVMs. Each of the three separate UCVMs also may have characteristics selected or optimized for web browsing. A copy of the file system within each of the three separate UCVMs does not contain any part of the user's files, as they are not required for the task performed by each UCVM, namely displaying a web page. Thus, each web application (or web page in this example) is completely isolated from the rest of the system.

In an embodiment, a UCVM may be connected to the Internet according to an access policy determined by the nature of the code running within the UCVM. To illustrate, web pages are typically restricted as per a strict "same origin policy" similar to the rules implemented by modern web browsers. In the "same origin policy," scripts running on web pages are permitted to access methods and properties of other scripts originating from the same site with no specific restrictions, but are prevented from accessing most methods and properties across web pages on different sites. Untrusted native applications running outside of the web browser are restricted by default to be able to connect only to the domain from which the program was downloaded (and to specific content delivery networks (CDNs) that may be in use by the domain in question).

This level of network access for downloaded applications can be explicitly changed (increased or decreased) by the end-user to include additional sites on the Internet. End-user control over what a UCVM can connect to may be subject to certain limitations related to corporate networks and sensitive web sites (such as a bank and web mail provider). For example, any code running in a UCVM may not, in general, access any site on a corporate Intranet to which client 100 is connected. Applications that need to connect to the corporate Intranet may need to be signed by the IT administrator of the domain. Similarly, non-web untrusted application code in a general UCVM may not connect to a web site associated with a search engine or bank or other sites that may have been previously identified as being "off limits." These connections can only be made through a web browser (which spawns UCVMs bound to these special domains) or from a special purpose LVM called a VVM, which described in further detail below.

In an embodiment, there is no communication channel available for an application running in one UCVM to communicate with an application running in another UCVM. Thus, applications running in UCVMs are completely isolated from each other and from the other applications in the system. This is well suited for running downloaded third party local applications which are generally designed to be self-contained or for Internet applications (web pages are not supposed to rely on any communication between applications within the web browser). In an alternate embodiment, communication between an identified set of virtual machines can be enabled by a person with sufficient privileges, such as an IT administrator for client 100.

Firewall Virtual Machine

In an embodiment, the implementation of the network access restrictions is done in a dedicated VM called a firewall VM. FIG. 1 depicts an exemplary firewall VM 150 of an embodiment. Firewall VM 150 runs an isolated operating system with a dedicated and fixed set of firewall applications that implement the network access policy for all VMs in client 100 (except perhaps VM0 130, which may not have any network access). Firewall VM 150 may provide, to any virtual machine running on client 100 in which untrusted code is executed or untrusted data is being interpreted, restricted access to only those network resources deemed necessary on an as-needed basis in accordance with a policy described by policy data stored on client 100.

In another embodiment of the invention, the firewall functionality of the system may be co-located and implemented inside either the hypervisor 120 of FIG. 1, or inside the LVM 140 of FIG. 1 (working in conjunction with the hypervisor 120 of FIG. 1), or inside VM0 130 of FIG. 1 (working in conjunction with the hypervisor 120 of FIG. 1).

Validated Virtual Machines—VVMS

UCVMs may not appropriate to run local applications that interact heavily with each other using local APIs such as COM, as typically there is no communication channel available for an application running in one UCVM to communicate with an application running in another UCVM. Embodiments may employ one (or more) special UCVMs called a Validated Virtual Machine (VVM) for the purpose of running relatively trusted local applications that have complex interactions between the applications. Such complex interactions are common in enterprise frameworks containing multiple applications, such as Microsoft's Office Suite and IBM's Lotus Notes.

FIG. 1 depicts an exemplary VVM 166 of an embodiment. Note that while FIG. 1 depicts a single VVM for ease of explanation, other embodiments of the invention may employ two or more VVMs or no VVMs based upon the particular needs of the user and/or policies of the organization responsible for or the owner of client 100.

Applications may need to be signed and configured for co-location in the same VM by an administrator of client 100 before they can run in VVM 166. Inside VVM 166, signed applications can interact with each other using all types of APIs and frameworks supported by the OS being used. In an embodiment, the default network access policy of a VVM is to allow access to a corporate network only. The IT administrator may increase or decrease this level of access, subject to certain restrictions.

In an embodiment, specific signed applications or suites (groups of applications) that originate from a trusted source (other than the enterprise) may also be designated to run together in a particular VVM responsible for applications originating from that source. For example, all non-corporate applications that are signed by a specific vendor may be run together in a single VVM. These applications would then be isolated from corporate applications and general untrusted applications, but not from one another. A specific network access rule that is more permissive than the "same origin policy" used for web applications and unsigned applications may be used for a VVM. The restricted copy of file system 142 exposed to a VVM is similar to that exposed to a generic UCVM in that the restricted copy of file system 142 exposed to a VVM comprises only those files related to, or required for, performance of the applications executing within the VVM.

The Restricted File System Exposed to a VM

Figure 3:
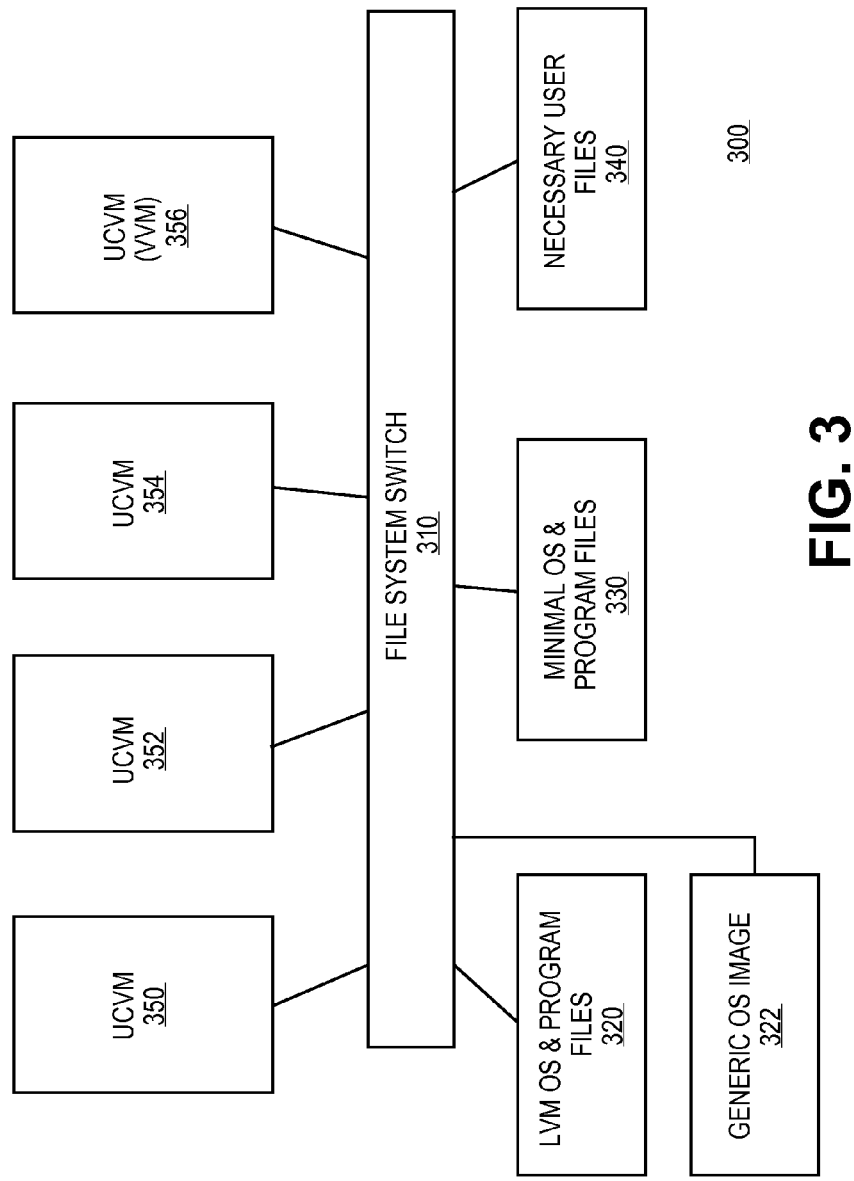
FIG. 3 is block diagram of the functional components involved in exposing a restricted copy of the file system to different UCVMs (and VVMs) according to an embodiment of the invention.

FIG. 3 is block diagram of the functional components involved in exposing a restricted copy of file system 142 to different UCVMs (and VVMs) according to an embodiment of the invention. File System Switch 310 is software that is configured to provide the newly created UCVM with access to a copy-on-write clone of the OS image that the UCVM was created from once the UCVM has started. The minimal operating system and program files 330 in the copy-on-write clone may be created from either the corporate LVM OS image 320 or a separate generic stripped down OS image 322 which may be created by the IT administrator.

Furthermore, a newly created UCVM is provided a copy of necessary user files 340, which are a subset of the user files in file system 142. The composition of necessary user files 340 may be different for each user and for each task. The set of files comprising the user files in file system 142 maintained in LVM 140 are typically those files in the user's home folder, e.g., c:\Users\<username>. The particular copies of files that are provided to a particular UCVM as necessary user files 340 are the minimum set of files that are needed by that UCVM to accomplish what the user intended to do as captured when the target application was being invoked. For example, if the user double clicked on a specific MS Word file named ABC.docx at the location c:\Users\<username>\Documents in the file system 140 maintained in LVM 140, then necessary user files 340 would only include a copy-on-write clone of the ABC-.docx file and only this copy-on-write clone of the ABC.docx file is made available in the virtual c:\Users\<username>\Documents folder made visible to the newly created UCVM running the MS Word application. If a program (like MS Word) was started without any association with a file, then necessary user files 340 would correspond to an empty c:\Users\<username>\Documents virtual folder.

Any application running in a UCVM therefore only has access to the particular set of user files provided explicitly by the user when the program was invoked. Subsequently, if the user wants to browse file system 142 for another file from within the application (for example, by using the File→Open menu item of MS Word), then he or she will see a restricted user files directory.

Figure 4:
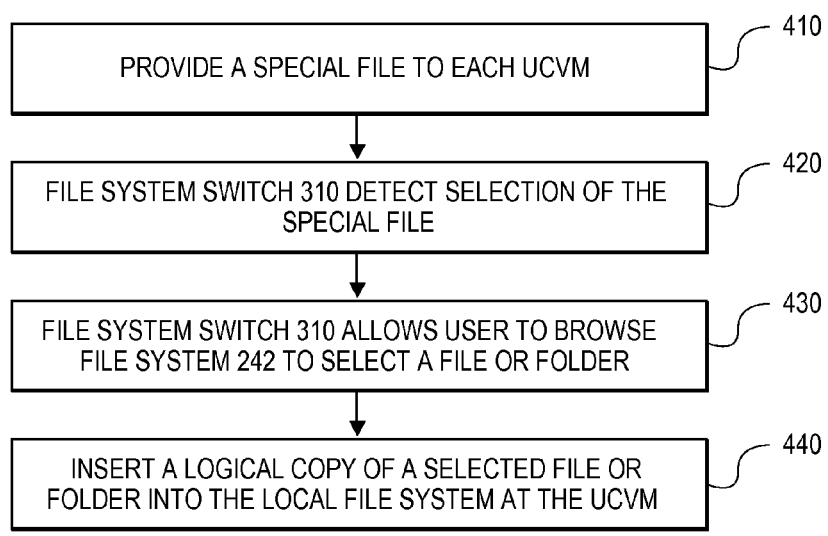
FIG. 4 is a flowchart illustrating the steps involved in a UCVM obtaining a copy of a new user file maintained in the file system stored elsewhere according to an embodiment of the invention.

To enable a user to select files from the user's own User Files folder in file system 142 maintained in LVM 140 using an application executing within an UCVM, a user interface may be provided to allow the user to browse his or her files in file system 142, select one or more of the user files, and expose a copy of the selected files to the appropriate UCVM. FIG. 4 is a flowchart illustrating the steps involved in a UCVM obtaining a copy of a new user file maintained in file system 142 according to an embodiment of the invention. In step 410, a special file is provided to each UCVM. The special file may be provided to the UCVM in a number of different ways, e.g., the special file may be inserted into each folder of the virtual C:\Users\<username> directory provided to each UCVM. This special file may be named something akin to "Show All My Files" or the like, as its selection will be used to trigger exposing additional copy-on-write clones of files stored in file system 142 to the UCVM.

In step 420, File System Switch 310 detects when the special file is selected by the user. For example, when a program executing within a UCVM browses to the special file, presumably as a result of a user click, this action may be trapped by File System Switch 310.

In step 430, File System Switch 310 invokes a dialog with LVM 140 that allows the user to browse the full file system 142 maintained in LVM 140. The user may then select a file or folder in file system 142. Note that at this stage, the user may be granted read access to the full file system 142 for purposes of selecting a file or folder, but the user is not granted write access to file system 142. Therefore, the user is prevented from modifying file system 142 maintained by LVM 140 in any way.

In step 440, after the user selects a file or folder, a copy of the selected file or folder is created. The copy of the selected file or folder is then inserted into the restricted file system associated with the UCVM. As a result of inserting the copy of the selected file or folder in the restricted file system associated with the UCVM, an application executing in the UCVM may have read and write access to the copy of the selected file or folder in the virtual file system, but is prevented from effecting any change to the original copy of the selected file or folder in file system 142 maintained by LVM 140.

The steps of FIG. 4 ensure that files in file system 142 maintained by LVM 140 are not visible to a UCVM without explicit permission from the user. Malicious code running in a UCVM, for example, cannot programmatically access files in file system 142 in LVM 140. Further, malicious code running in a UCVM also cannot render a false user interface to trick the user into unintentionally providing any user files to the malicious code, since all code responsible for rendering the user interface is maintained within VM0 130, and thus, unreachable by the malicious code.

File System Switch 310 may be implemented in a variety of ways. For example, in one embodiment, File System Switch 310 may be implemented by a network file system protocol (NFS or CIFS may be used). A special VM (or LVM 140) may be used as the OS serving the "User Files" shared file system. Other VMs "mount" this shared file system using NFS or CIFS (or another network file system) from the hosting VM. Application software in the hosting VM may decide what files are exposed to which VM based on instructions provided by VM0 130.

In another embodiment, File System Switch 310 may be implemented, in part, by a proprietary protocol for handling communications between the different UCVMs and File System Switch 310. File System Switch 310, in such an embodiment, may be implemented as part of a special VM or in LVM 140.

Cloning a UCVM from a Template

In an embodiment of the invention, a virtual machine created in client 120 is instantiated using a template selected from one or more templates 138 stored in VM0 130. In an embodiment, each template in one or more templates is either immutable or updatable in a very controlled fashion.

Each of one or more templates 138 may be used to instantiate or create a virtual machine with different characteristics or operational parameters. The characteristics or operational parameters described by a template may be configured, tailored, or suited for a particular context or type of processing activity. For example, each template may specify what type of code is to be run within a virtual machine created using the template, a size of the virtual machine created using the template, firewall settings for the virtual machine created using the template, what type of virtual machine (for example, a VVM, UCVM, or a LVM) is the be created using the template, how changes to a local file system within the virtual machine created using the template are to be persisted, and what portion, if any, of the network can a virtual machine created using the template access.

One or more devices internal to client 100 or externally connected to client 100 may interact with one or more processes executing in a virtual machine within client 100. In an embodiment, a template may assign responsibility for a selected set of devices to a virtual machine created using the template. In other embodiments, responsibility for a selected set of devices may be assigned to a particular virtual machine by virtue of policy data stored on client 100. Such policy data may describe one or more policies provided to client 100 from an owner or responsible organization of client 100. Policy data of this nature may be maintained by VM0 130 or LVM 140, for example, in certain embodiments.

In an embodiment, one or more templates 138 may be arranged in a hierarchy such that there is a root node corresponding to a template having a default set of characteristics. The root node may have one or more child nodes, and each of these child nodes may be associated with a template that inherits the properties of the parent template, but contains additional or changes properties associated with that child node. Naturally, each child node may also have children, and so the hierarchy of templates may be an arbitrary number of levels deep, where each template inheriting characteristics of its parent, but yet each template is capable of further defining or changing characteristics that distinguishes the template over its parent.

Branches of the hierarchy of templates may be associated with, or more particularly suited for, different types of activity. For example, certain templates may be associated with corporate activity, and may therefore specify characteristics related to virtual machines running corporate applications. Similarly, certain templates may be associated with the user's personal application's activity or Internet/Web related activity, and may therefore specify characteristics related to virtual machines running the user's own applications or Internet/Web applications respectively.

Platform Virtualization

Platform virtualization is performed on a given hardware platform by host software (a control program), which creates a simulated computer environment, termed "a virtual machine," for its guest software. A hypervisor, also called virtual machine manager (VMM), is one of many hardware virtualization techniques that allow multiple operating systems, termed "guests," to run concurrently on a host computer. The hypervisor presents to the guest operating systems a virtual operating platform and manages the execution of the guest operating systems. A guest OS executes as if it was running directly on the physical hardware. Access to physical system resources such as the network access, display, keyboard, and disk storage is suitably virtualized so that a guest OS does not know that these are virtual devices.

Generally, there are two types of hypervisors. Type 1 (or native, bare metal) hypervisors run directly on the host's hardware to control the hardware and to manage guest operating systems. A guest operating system thus runs on another level above the hypervisor. Type 2 (or hosted) hypervisors run within a conventional operating system environment. With the hypervisor layer as a distinct second software level, guest operating systems run at the third level above the hardware. In other words, Type 1 hypervisor runs directly on the hardware; a Type 2 hypervisor runs on another operating system, such as Windows. Embodiments of the invention may use any type of hypervisor. Thus, hypervisor 120 in FIG. 1 may either be a Type 1 or a Type 2 hypervisor.

A virtual disk image (or simply "a virtual disk") is a file on a physical disk, which has a well-defined (published or proprietary) format and is interpreted by a hypervisor as a hard disk. A virtual disk image may have a specific file type extension, e.g., .vmdk for VMware VMDK, .vhd for Xen and Microsoft Hyper-V, and .vdi for Oracle VM VirtualBox.

There are two approaches employed for storage allocation by prior hypervisors, namely, (1) pre-allocate the entire storage for the virtual disk upon creation and (2) dynamically grow the storage on demand. In the former approach involving pre-allocation, the virtual disk may be implemented as either split over a collection of flat files (typically one is at least 2 GB in size) or as a single, large monolithic flat file. In the latter approach involving on-demand growth, the virtual disk may also be implemented using split or monolithic files, except that storage is allocated on demand.

There are two modes in which a disk can be mapped for use by a virtual machine. In a virtual mode, the mapped disk is presented as if it is a logical volume, or a virtual disk file, to the guest operating system and its real hardware characteristics are hidden. In a physical mode, also called the pass through mode, the hypervisor bypasses the I/O virtualization layer and passes all I/O commands directly to the disk.

A virtual machine (VM) is a software implementation of a machine (i.e. a computer) that executes programs like a physical machine. Virtual machines allow the sharing of the underlying physical machine resources between different virtual machines, each running its own operating system. The software layer providing the virtualization is called a hypervisor, such as hypervisor 120 in FIG. 1.

Virtual machines each require their own image of the operating system. The guest OS and host OS typically do not share the OS image, even if they are the same OS. This is problematic for several reasons. First, if a user wishes to run 10 different virtual machines, then she will require 10 different copies of the OS for the guest OSs, which requires an undesirable amount of storage to maintain. Second, the OS for a VM has to be created either by installing a new OS or shipping a copy of the OS from somewhere else, which is burdensome for those who do not have access to OS images. It is also time consuming to install a new OS or ship an OS image, which is typically quite large. A third problem is that any software present in the host OS (such as a printer driver) will not be available in a guest OS unless it is installed again.

Figure 5A:
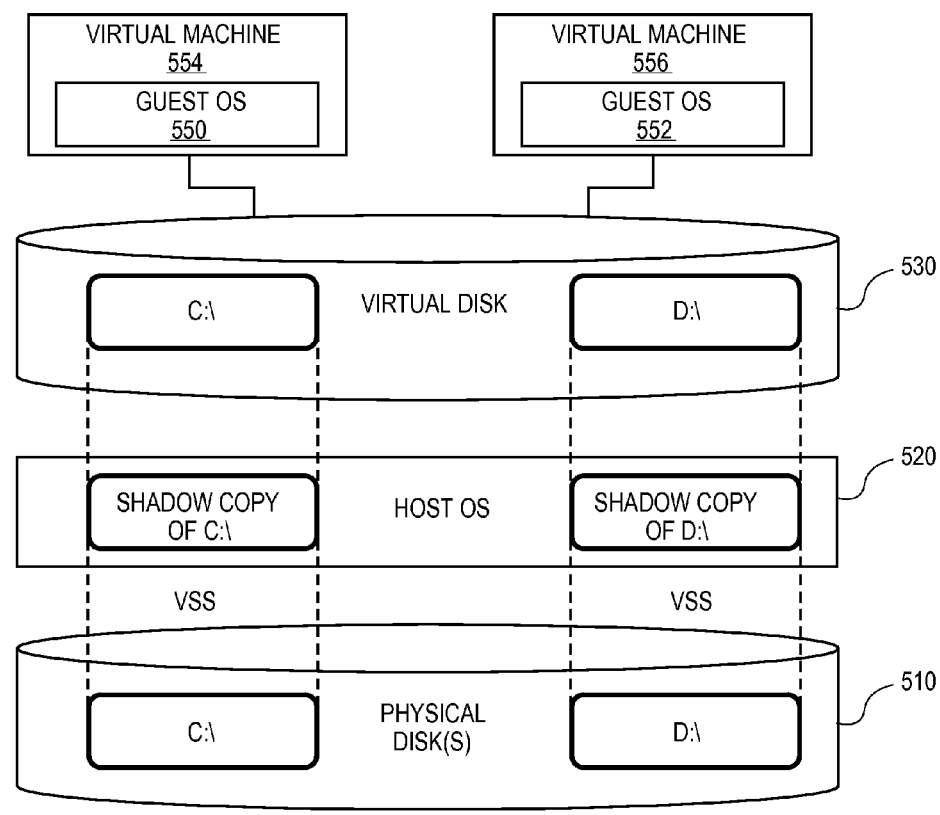
FIG. 5A is an illustration of a virtual disk stack according to an embodiment of the invention.

Embodiments of the invention enable a guest operating system to be provided to a virtual machine in a manner that overcomes the disadvantages of the prior art, such as requiring a separate operating system be installed in each virtual machine. FIG. 5A is an illustration of a virtual disk stack according to an embodiment. FIG. 5A depicts a virtual disk stack comprising one or more physical disks 510 upon which a host operating system 520 is installed. Virtual disk 530 is a physical file stored on one or more physical disks 510 that is interpreted by a virtual machine as a physical disk.

The illustration of FIG. 5A will be referenced below in the discussion of FIG. 5B, which is a flowchart illustrating the functional steps of providing a guest operating system to a virtual machine according to an embodiment of the invention. In an embodiment, the guest operating system provided to a virtual machine is read by the virtual machine from virtual disk 530. It is noted that each step of FIG. 5B may be performed programmatically, i.e., each step of FIG. 5B may be performed by a software entity.

Figure 5B:
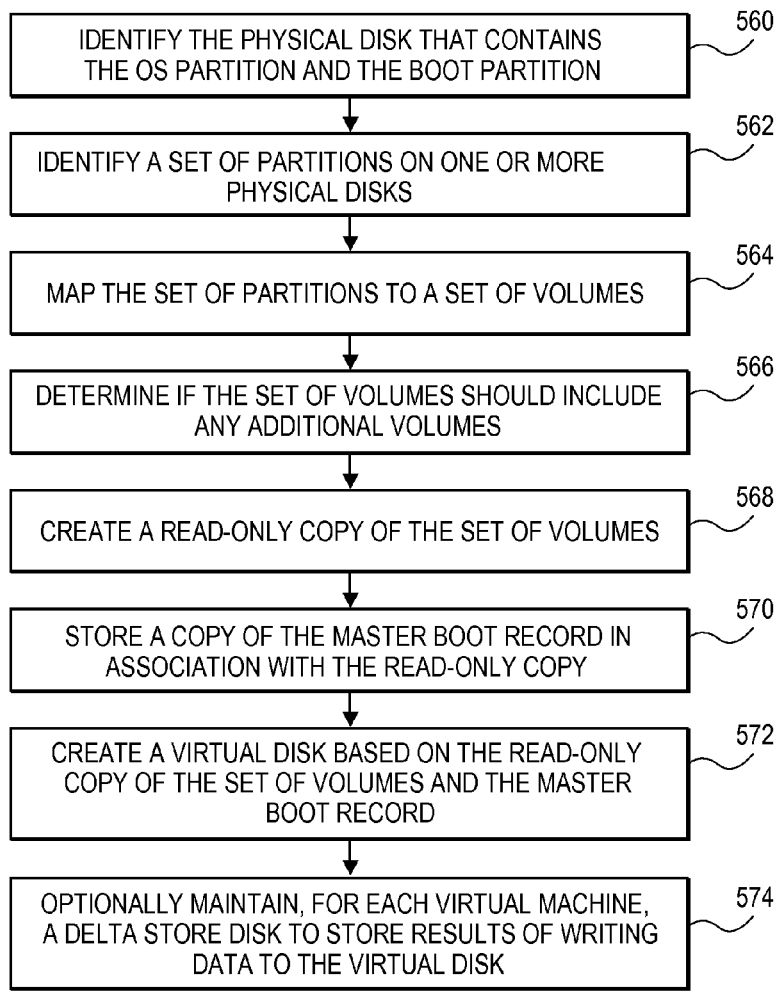
FIG. 5B is a flowchart illustrating the functional steps of providing a guest operating system to a virtual machine according to an embodiment of the invention.

In step 560 of FIG. 5B, a physical disk that contains a system partition and a boot partition is identified. The physical disk containing the system partition and the boot partition may be one of the one or more physical disks 510 in FIG. 5A. As used herein, a system partition is a disk partition that contains the operating system files. For example, in a Microsoft Windows environment, the disk partition would contain the Windows operating system files (e.g., the Windows directory). As used herein, a boot partition is the disk partition that contains the bootloader. The boot partition may be identified by an API call and an examination of the BootIndicator flag, while the system partition may be identified by an examination of environment variables. The system partition may be, but need not be, different from the boot partition, although they are often on the same partition (such as drive C:).

A system partition may be identified by examining the drive letter of a volume on which host operating system 520 is installed using an exposed API. Alternately, the system partition may be identified by examining certain environment variables, such as SystemDrive, SystemRoot, or WinDir, for example. Boot partitions may be identified using an exposed API, e.g., by examining a BootIndicator field of the partition layout data structure using the Windows API.

In step 562, information about the physical layout of the one or more physical disks 510 is obtained. To illustrate, in performing step 562, information identifying a list of partitions on the one or more physical disks 510 may be determined.

In step 564, certain partitions of the one or more physical disks 510 are mapped to a set of volumes to be included in virtual disk 530. In step 564, each volume that is going to be included in virtual disk 530 is mapped to a partition on one or more physical disks 510 so that the exact starting offset and the size for each volume to be included in virtual disk 530 is known.

In step 566, a determination is made as to whether any additional volumes should be included in the set of volumes that are to be included in virtual disk 530. Digital content such as program files and user files may be stored in a variety of locations. If the location where such program files and/or user files are stored is on a different volume of a physical disk other than those identified in step 564, then this volume should be included in virtual disk 530. Such locations may be identified using a variety of different means, e.g., by examining system environment variables such as ProgramFiles, ProgramData, or UserProfiles, or by querying an operating system API.

In step 568, a read-only copy of the set of volumes to be included in virtual disk 530 is created. After creation, the read-only copy of the set of volumes is stored on one or more physical disks 510.

In one embodiment, the read-only copy of the set of volumes to be included in virtual disk 530 may be created using a Shadow Copy. Shadow Copy (Volume Snapshot Service or Volume Shadow Copy Service or VSS) is a technology included in Microsoft Windows that allows taking manual or automatic backup copies or snapshots of data (termed "shadow copies") on a specific volume at a specific point in time over regular intervals.

In step 570, a copy of the master boot record (MBR) for the set of volumes to be included in virtual disk 530 is stored. The MBR is a type of boot sector. Embodiments may be used with a wide variety of MBRs and are not limited for use with one type of MBR. For example, the copy of the MBR stored in step 570 may correspond to a Basic or Dynamic Disk with either MBR or GUID style partitioning. The MBR contains a partition table and code for initiating the booting process of host operating system 520.

A MBR cannot be shadow copied, and so in an embodiment it is contemplated that in step 570 a physical byte-to-byte copy is created and stored on one or more physical disks 510. The copy of the MBR may be stored in association with the read-only copy of the set of volumes made in step 568. The size of the MBR may be determined as an offset of the first partition of one or more physical disks 510, which may be larger than necessary, but avoids the concern about missing any data stored in this drive space by OEMs. Note that certain embodiments may configure the MBR copy to omit entries for partitions which are not relevant to the virtual machine template, e.g., the OEM recovery partition. Such configuration of the MBR copy may be performed by mapping zeros over the entries or by omitting the virtual disk extents mapping this area of the physical disk.

In step 572, virtual disk 530 is created based on the read-only copy of the set of volumes and the MBR stored in step 570. In an embodiment, virtual disk 530 is a file, physically stored on one or more physical disks 510, that conforms to a well-defined (published or proprietary) format which allows the file to be interpreted by a hypervisor as a hard disk.

In the VMDK file format, virtual disks can be described as a set of extents, which are a contiguous set of disk sectors. A particular extent of a virtual disk can be mapped to a variety of different storage devices, such as hard-drive device, a volume device, or a file on a host file system, to name a few examples. To access the shadow copy created by VSS, a VDMK extent is mapped to a device using the device name that VSS assigns to that particular shadow copy. For example, a typical VMDK may indicate an extent from sector 0 to sector 2042 is mapped to win2.mbr on a local file system, an extent from sector 2048 to sector 2000000 is mapped to VSS shadow copy device \\?\GLOBALROOT\Device\ HarddiskVolumeShadowCopy8, and an extent from sector 2000001 to 2000002 is ZERO (the virtual machine will interpret these sectors as empty if they are accessed).

In VMDK, one cannot specify a particular extent's offset—only the size can be specified. Thus, to match the layout of a physical drive being virtualized, the extent that corresponds to a volume on a physical disk that was not considered worthless to be made accessible in a virtual machine, still needs to be present in the VMDK description; however, the type of such extent will be specified as ZERO to indicate that this extent occupies the space but is not mapped to any storage device.

Another situation when a ZERO extent may be used by an embodiment is when the operating system uses some sectors in the end of a partition for its own purposes. In this case, the size of the partition reported by the operating system API will be N, but the offset of the next partition will be N+X, where X is the amount of sectors reserved by the operating system. A ZERO extent of size X may be specified in the VMDK description of the virtual disk to account for this difference, as shall be explained below.

According to one embodiment, for any volumes in virtual disk 530 which had a corresponding read-only copy (such as a shadow copy) created in step 568, the volume in virtual disk 530 is described as a read-only extent having a type of FLAT and which references the corresponding read-only copy. For example, the boot and system volumes in virtual disk 530 may be implemented as a read-only extent have a type of FLAT and which references the corresponding read-only copy. For any other volume in virtual disk 530 which did not have a corresponding read-only copy (such as a shadow copy) created in step 568, the volume in virtual disk 530 is described as a read-only extent having a type of ZERO.

In an embodiment, if the partition start offset of virtual disk 530 is greater than an offset calculated by the partition start offset and size of the partition identified in step 560, then the different is accounted for using an extent. In such a case, a read-only extent is created that has a type of ZERO and a size equal to the difference between the partition start offset of virtual disk 530 and the calculated offset.

Advantageously, virtual disk 530 of FIG. 5A allows for many guest OSs running on the same host to share the same installed copy of an operating system as the host OS. To illustrate, as shown in FIG. 5A, guest OS 550 and 552 may each access virtual disk 530. Virtual disk 530, in turn, may contain a copy of host OS 520. However, virtual disk 530 is constructed using a single copy of an operating system that is physically stored and installed upon one or more physical disks 510. Thus, virtual machine 554 and virtual machine 556 may each execute a guest OS without the need to install a new operating system for those virtual machines.

VSS shadow copies may be created fast and efficiently. Thus, in an embodiment employing VSS shadow copies, the read-only copies of the one or more volumes created in step 568 is performed quickly and efficiently. Also, the creation of virtual disk 530 using the read-only copy of the one or more volumes is also a very fast operation. As a result, virtual machines (having a guest operating system of the same type as the host operating system) can be created very quickly and efficiently.

Shadow copies may also be maintained cheaply by certain operating systems, such as the MS Windows, by maintaining data about the changes made to a volume since the time a shadow copy was made for that volume. Hence, the disk usage of multiple virtual machines may be reduced substantially.

Since a VSS shadow copy contains all the software the user has installed on the machine at the time of the creation of the VSS shadow copy, virtual disk 530 that is created using a VSS shadow copy also receives access to all the software present in the VSS shadow copy. Moreover, the version of the software, including any patches installed, is exactly the same as in the original volume being shadow copied. In addition, user documents present in the original volume being shadow copied are also present in virtual disk 530, and therefore, visible to virtual machines which perform read operations against virtual disk 530. Thus, virtual disk 530 of an embodiment is an accurate point-in-time copy of host physical disk.

Delta Store Disk

Figure 5C:
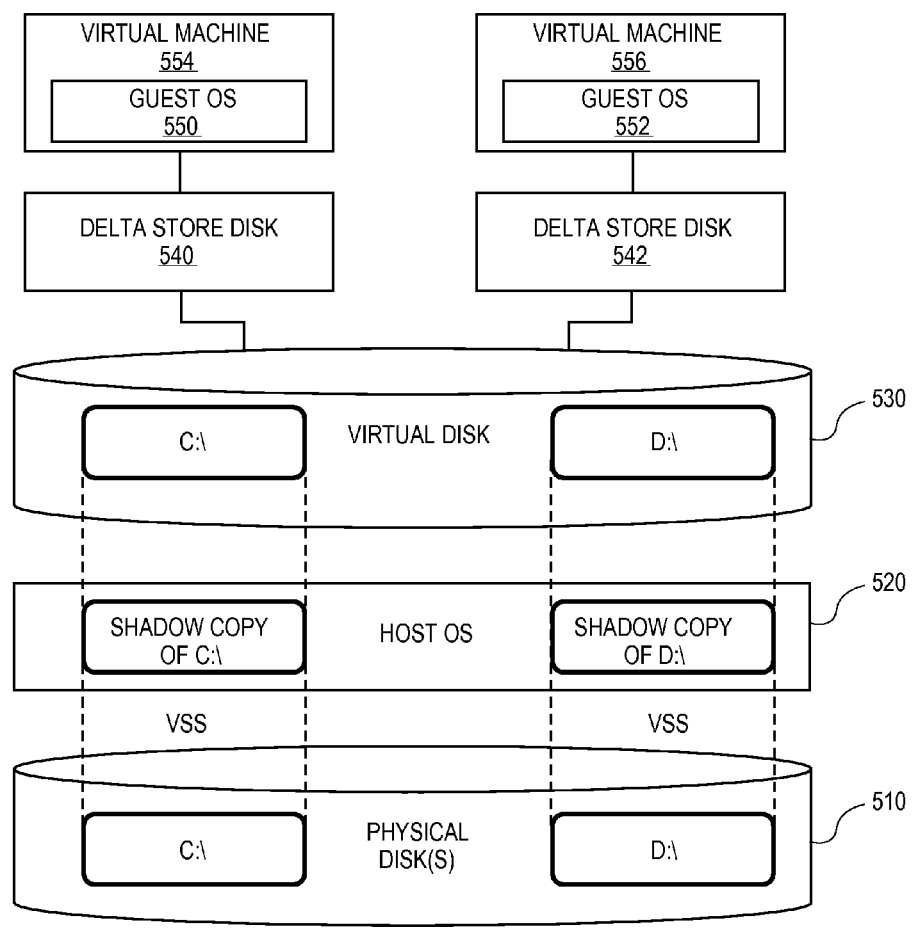
FIG. 5C is an illustration of a virtual disk stack for two virtual machines according to another embodiment of the invention.

In certain embodiments, a 'Delta Store Disk' may be comprised within the virtual disk stack. FIG. 5C is an illustration of a virtual disk stack for two virtual machines according to another embodiment of the invention. A delta store disk is a mechanism that may be used to capture changes desired to be made to virtual disk 530. Such an approach is advantageous because, as explained above, VSS shadow copies are read-only. Thus, even though virtual disk 530 may be constructed using a read-only copy of one or more volumes of physical disk(s) 510, write operations performed by a virtual machine may be simulated using a delta store disk.

This technique may be illustrated in a description of optional step 574 of FIG. 5B. In optional step 574, one or more results of the virtual machine performing write operations against the virtual disk are stored in a delta store disk. For example, the results of write operations performed by virtual machine 554 against virtual disk 530 may be stored at delta store disk 540. Note that each delta store disk is associated with a particular virtual machine and only stores changes made to virtual disk 530 by that virtual machine. In this way, the results of write operations performed by virtual machine 556 against virtual disk 530 are stored at delta store disk 542.

When a virtual machine performs a read operation against virtual disk 530, the virtual machine initially attempts to perform the read operation against data stored at an associated delta store disk. If the attempt to perform the read operation at the associated delta store disk is not successful, then the virtual machine performs the read operation against the virtual disk 530. For purposes of providing a concrete example, assume that virtual machine 556 is performing a read operation against virtual disk 530. Initially, to perform this read operation, virtual machine 556 will attempt to perform the read operation against delta store disk 542. In this way, if virtual machine 556 had previously updated the value of what is being read to deviate from virtual disk 530, then the read operation will be performed by reading the updated value, rather than the original value present on virtual disk 530. If the read operation performed against delta store disk 542 is not successful, then this means that virtual machine 556 never stored an updated value for data being read by this read operation, and therefore, the read operation is performed against virtual disk 530.

In an embodiment, the changes stored at a delta store disk correspond to updated blocks of virtual disk 530. In other embodiments, the changes stored at a delta store disk correspond to updated files stored on virtual disk 530.

Security Afforded by Embodiments

Embodiments of the invention provide a secure environment to prevent malicious code from affecting any lasting change in a computer system. Arbitrary code (either a web application or a native executable) runs inside an isolated operating system running on an isolated virtual machine. This code has no access to any other application (either a native application or a web application) being run by the user because those applications run in other operating systems running in separate virtual machines. Moreover, arbitrary code has access to only the specific part of the file system that is needed for correct execution of the code. Access to additional parts of the file system has to be provided by code that runs in VM0 (which is secure and fortified against unauthorized intrusion) and any increased access needs explicit authorization from the human user.

Specific trusted code that needs to interact in a complex way with other applications may be explicitly designated to run together inside the same designated VM. This type of VM also has limited access to the file system.

All code has limited network access to just what that code needs for its correct execution. All virtual machines are created from templates stored in VM0 which are either immutable or can be updated in a very controlled fashion. Consequently, if a security bug exists in a piece of code, the effect of the security bug is isolated ("space limited") because the compromised code has access to only a limited part of the file system, the network, devices, etc. Moreover, the effect of the security bug is "time limited" because the virtual machine that has been compromised will be subsequently discarded and a new virtual machine is created for future application instances from a clean immutable VM template.

Using Policy Data to Manage the Deployment of Virtual Machines

Embodiments allow code that originates from arbitrary external sources to be safely executed by a client. In this way, digital content of unknown trustworthiness may be safely received and potentially executed and/or interpreted by a client without incurring the risk that the digital content contains malicious code that could cause undesirable consequences.

The 'digital content' received by the client from an external source may correspond to any type of digital data, such as executable code or non-executable, interpreted data for example. Since malicious code may be carried within certain types of non-executable data and subsequently spread when the data is interpreted by applications, embodiments treat all incoming digital content as being capable of containing malicious code, even if the digital content is not in a recognized executable form. Non-limiting, illustrative examples of digital content include an ".exe" file, an application, a collection of applications designed to run together, a portion of an application, an email attachment, a slide presentation, a text document, and a web page (which essentially is a portion of an application, namely a web browser). Even though the email attachment, the slide presentation, and the text document, in and of themselves, are not executable files, embodiments of the invention treat these forms of digital content as potentially carrying malicious code.

To manage the risk posed by receiving digital content of unknown trustworthiness, any digital content received by a client is stored in one or more virtual machines. In an embodiment, digital content received from an external source may immediately be stored in one or more virtual machines upon receipt. Alternately, digital content received from an external source may be stored in an intermediate location, such as a local cache, prior to storing the digital content in a virtual machine.

While embodiments are configured to process all digital content originating from an external source in a virtual machine, the complexity of determining in which virtual machine the digital content should be stored and how that virtual machine should be configured is hidden from the user whenever possible or appropriate. To accomplish this goal, techniques are discussed herein for programmatically managing a plurality of virtual machines on the client to accommodate the wide variety of use cases for receiving digital content at a client. However, in some cases, explained in more detail below, it may be appropriate to inform the user of certain activity concerning a virtual machine, such as when obtaining express permission from the user is advisable before performing an action.

Certain sources of digital content are more trustworthy than other sources. For example, the web site of a bank or Fortune 500 company may be more trustworthy than the web site of a smaller company or lessor known organization. Also, applications may have different operating needs, e.g., certain applications may be designed to work closely with other applications or require access to network resources. Thus, in an embodiment, the attributes of each virtual machine are specifically tailored to reflect the type of digital content and/or applications operating or stored therein.

To illustrate how one embodiment operates, when a client determines that digital content, originating from an external source, is to be received or processed by the client, the client may identify, without human intervention, one or more virtual machines, executing or to be executed on the client, into which the digital content is to be received. To do so, the client may consult policy data, such as policy data 139 stored at client 100 of FIG. 1, to determine a placement policy, a containment policy, and a persistence policy used in identifying the one or more virtual machines into which the digital content is to be received.

The policy data may be used to specifically tailor the operation of each virtual machine to reflect the type of digital content and/or applications operating or stored therein. The placement policy identifies a particular virtual machine into which the digital content is to be stored, the containment policy identifies what network resources and client resources the particular virtual machine can access, and the persistence policy identifies whether data (or a part of it) stored in the particular virtual machine is persistently stored. Naturally, the placement policy, containment policy, and persistence policy are, to a certain extent, intertwined, as the resources a virtual machine may access and whether data stored therein is persisted will affect what applications/digital content are appropriate to reside therein.

In an embodiment, each of the placement policy, the containment policy, and the persistence policy may consider a variety of different factors. For example, the placement policy, the containment policy, and/or the persistence policy may consider a historical record of use for the client in identifying a virtual machine. The evaluation of a policy may involve consulting a historical record of how the client, or applications running thereon, has been used. In this way, if a particular action has been judged to be more safe (or less safe) over a period of time, the manner in which the action is handled by the policy may evolve over time. To illustrate, in an embodiment, if a particular network resource, such as an affiliate corporate web page, is demonstrated to be sufficiently safe over a period of time, then this web page may be processed using relaxed restrictions, e.g., by a web browser in a virtual machine already handling another trusted web page as opposed to instantiating a new virtual machine to handle the affiliate corporate web page. On the other hand, if the historical record of use demonstrates that an action involving a particular network resource or client resource may pose some risk to the client, then the policy may subsequently handle this action more sensitively than before, e.g., by assigning code to handle the particular network resource or client resource in a dedicated virtual machine with restricted access to client and network resources.

As another example of the types of factors which may be considered by a policy, one or more of the placement policy, the containment policy, and the persistence policy may consider a current physical location of the client or to which networks the client currently has access in identifying one or more virtual machines which should be used to receive content. In this way, which networks are available to the client, the IP address assigned to the client, the current location of the client based on global positioning service (GPS) data, and the current location of the client based on an IP address or which networks are available to the client may all be considered when determining which virtual machine should receive digital content and what restrictions should be placed on that virtual machine. In this way, when the client is physically located in an area deemed safe (such as a work office or home), digital content received by the client may be handled by a virtual machine having a set of lesser restrictions than when the client is physically located in an unknown area.

As another example of the types of factors which may be considered by a policy, one or more of the placement policy, the containment policy, and the persistence policy may consider the proximity of the client to a wireless device, such as a Bluetooth enabled cell phone. For example, if the client is not within a configurable distance to the cell phone of the user of the client, then the client may receive digital content using a set of greater restrictions, e.g., code executing in all virtual machines may be denied access to certain client resources and/or all network resources. Embodiments may determine whether the client is within a configurable distance to a wireless device using a variety of different methods, such as accessing the wireless signal strength between the client and the wireless device.

In an embodiment, at least a portion of the policy data, used in identifying one or more responsible virtual machines to receive digital content, is obtained from a remote server after the client determines that digital content is to be received from an external source. In this way, policy data may be sent, as needed, from an IT administrator to the client. The client may treat any policy data already residing on the client in the same manner as policy data retrieved from a remote server. For example, when a user of the client performs an action, the client may consult a remote server to see if the remote server has any additional policy data regarding this action. Following this procedure, an IT administrator can maintain a high level of control on how the client will manage virtual machines running on the client. This enables the IT administrator to make adjustments to the security model followed by the client in real-time. The client may interact with a human operator at a remote location to obtain additional policy data or may interact with a remote automated system, without human intervention, to obtain the additional policy data. Note that certain embodiments may be configured to consult a remote server for policy data only when a certain configurable action is taken. Therefore, in certain embodiments, the client need not always contact a remote server to determine if additional policy data is available each time that the client is to receive new digital content.

In an embodiment, the policy data may specify that the virtual machine assigned to receive digital content can only access a limited subset of the metadata properties for a client resource or a network resource. For example, a virtual machine may not be capable of determining what local wireless networks are available in the vicinity or whether the network card of the client is of a particular type. In this way, the amount and type of information exposed to a particular virtual machine may be controlled to a fine level of granularity.

Use of the placement policy, the containment policy, and the persistence policy by certain embodiments will be discussed in further detail below.

Placement Policy

The placement policy identifies a particular virtual machine into which the digital content is to be stored. The particular virtual machine identified by a placement policy in which digital content is to be stored may be an existing virtual machine or a new virtual machine that has not yet been instantiated. In the case where the placement policy specifies that the digital content should be received by a virtual machine that has not yet been instantiated, either the placement policy itself or some other location in the policy data will identify a template for use in instantiating the particular virtual machine. The identified template will describe characteristics of a virtual machine suitable for receiving the digital content.

The placement policy may weigh a variety of different considerations in determining which virtual machine should store the digital content so that the digital content may be safely executed, interpreted, and/or processed. For example, a placement policy of an embodiment may assign any file having a certain name or certain attributes to a virtual machine having certain characteristics. To illustrate, a placement policy may indicate that all signed executable files from an internal organization or company are to be assigned to a virtual machine having a specified set of characteristics. As another example, the placement policy may instruct untrusted applications to execute in separate virtual machines so that each untrusted application is isolated from other applications and data of the client.

The placement policy of an embodiment may identifies a plurality of classes of virtual machines, where each class of the plurality of classes is associated with a different trust level for external sources of digital content. Code executing in a virtual machine cannot access external sources associated with less trustworthy external sources of digital content. For example, assume there are three classes of virtual machines, where the first class of virtual machines is designed to run web browsers accessing web sites of financial institutions and email providers, the second class of virtual machines is designed to run web browsers accessing web sites of Fortune 500 companies, and the third class of virtual machines is designed to run web browsers accessing all other web sites. In this example, a web browser executing in a virtual machine that is associated with the third class cannot access any web sites from Fortune 500 companies or financial institutions and email providers. Similarly, in this example, a web browser executing in a virtual machine that is associated with the second class cannot access any web sites from financial institutions and email providers.

The placement policy of an embodiment may identify the particular virtual machine into which the digital content is to be received by observing application dependencies. Such a policy recognizes that in some instances, it is helpful or even necessary to execute certain applications within a single virtual machine. For example, certain providers of software applications may design their software applications do work together or integrate with each other to a high degree. In this case, it would be advantageous to have applications that are designed to work together to run within a single virtual machine. One way for the placement policy to make this determination would be to ask the user whether an application being installed is dependent upon another application already installed at the client to ensure that both applications may be run in the same virtual machine. While this does expose the notion of a virtual machine to the user, a user need only make a decision of this nature when an application is installed on the client, and thus, this decision may be made by IT administrators or other knowledgeable personal rather than relying upon the end user of the client to make such a decision.

Alternatively, determining whether an application being installed is dependent upon another application may be made programmatically by examining the dependencies during the installation of that application. For example, during the installation of application A, the install process may check if module B is already installed or may require that module B already by installed. In this example, the placement policy may determine then that application A has a dependency with module B and may therefore allow application A to run in same virtual machine as module B.

To illustrate another example, it is initially noted that there need not be a one to one correspondence between a web browser and a web page. For example, a web browser may comprise many tabs, and each tab may display a different web page. In addition, each web browser may have a variety of different plug-in and/or associated programs which may be treated as or considered a separate application. Since a web browser may display multiple web pages of varying trust levels, it is desirable to accommodate a web browser having multiple tabs without requiring that the web pages displayed by each tab reside in the same virtual machine. For example, if a web page contains malicious code, then it would be beneficial to execute it in a different virtual machine from the virtual machine containing the web page of your bank. Therefore, in an embodiment, the placement policy may specify that web page of certain sources should be received in a separate virtual machine. While the user may see a single web browser having two tabs, on the back end this may be implemented in two separate virtual machines that each execute a copy of the web browser and possess one web page to be shown in associated with one tab of the web browser. A practical implementation of web page placement may use a VM per web-site placement policy.

These are merely examples of how a placement policy may be implemented. It is contemplated that actual implementations of a placement policy will be configured based upon the particular needs and concerns of the end user. The containment policy of certain embodiments will now be presented in greater detail.

Containment Policy

The containment policy identifies what network resources and client resources a particular virtual machine can access. Network resources, as broadly used herein, refers to any resource that is external to the client while client resources, as broadly used herein, refers to any resources that is internal to the client. A client resource may include any device, component, and/or data residing on or accessible to the client, such as a digital camera, a network interface card, a digital clock, the current time, files, pictures, and email.

The containment policy is used to ensure that code running within a virtual machine has access to only those resources deemed necessary for normal and intended operation. For example, email attachments should not need access to the Internet (generally speaking), and so they should be opened in a virtual machine that is configured such that it does not have access to the Internet.

In an embodiment, the containment policy may specify what portion of the network that is available or exposed to code executing within a virtual machine. For example, the containment policy may specify that code executing within a particular virtual machine may access no network resources, all network resources, or a subset of the network resources. Thus, a containment policy may specify that code executing within a virtual machine may access a first set of network resources and may not access a second set of network resources. Embodiments may specify what particular network resources are available to a virtual machine using any level of granularity, e.g., only certain types of network resources may be exposed, only certain properties of network resources may be exposed, or only certain portions of the network may be exposed.

In an embodiment, enterprise applications may be grouped into collections. Groupings may be based on a variety of factors, such as job functions or business unit, for example. Each grouping of applications may be executed within a single virtual machine according to an embodiment.

To illustrate the interaction between the containment policy and client resources, the containment policy of an embodiment identifies each client resource accessible to a virtual machine. For example, a containment policy may specify whether code executing in the particular virtual machine can perform one or more of the following actions: access a USB port on the client, perform a copy operation or a paste operation, access a network to which the client is connected, access a GPS device of the client, location information for the client, or tilt information for the client, access a printer or facsimile machine to which the client is connected, and access a digital camera or screen data for the client. Note that these exemplary actions are not meant to provide an exhaustive list, as a containment policy may be used to specify, with particular specificity, which client and network resources may be accessed by code executing within a virtual machine. In this way, if a new client resource becomes available, such as fingerprint scanning device, the containment policy may be updated to reflect the new client resource available to the client.

In an embodiment involving the receipt of executable code at a client, the containment policy may specify that the executable code is denied access to a user file without first obtaining a user's permission to allow the executable code to access the user file. In this way, virtual machines may be configured to allows request permission each time executable code therein access a user file, thereby allowing the user to be informed of the intentions of the executing code and presumably prevent unauthorized access to the user's own files. Such a permission scheme might be implemented naturally as part of the normal user work flow of picking a file to open by running the permission code in a clean protected VM separate from the VM running the untrusted code which is making the request.

To illustrate the interaction between the containment policy and network resources, the containment policy of an embodiment identifies whether code executing in a particular virtual machine can one or more networks accessible to the client. As another example, the containment policy of an embodiment identifies which, if any, objects stored over a network the virtual machine can access. For example, a virtual machine may be restricted to access a specified set of objects or files on a particular server or a particular set of web pages.

In an embodiment, the containment policy may consider any number of factors, including but not limited an identity of the user of the client, a set of properties of the digital content, a physical location of the client, the current time, a holiday schedule, and a set of administrator-specified policy rules. In this way, the containment policy may assign a virtual machine having more restrictions than usual to receive digital content when the digital content is deemed more likely to contain malicious code. For example, it may be deemed likely that digital content contains malicious code when it is received by the client outside of normal business hours, over a holiday, at a time when the client is outside of the user's home or work office, or when the digital content has certain suspicious properties. In this way, the containment policy may assign suspicious digital content to be received in a virtual machine having additional restrictions appropriate for such suspicious digital content.

These examples of how a containment policy may operate and merely illustrative of some examples and are not intended to be an exhaustive list, as actual implementations of a containment policy will be configured based upon the particular needs and concerns of the end user. The persistence policy of certain embodiments will now be presented in greater detail.

Persistence Policy

In an embodiment, the persistence policy identifies whether data stored in a particular virtual machine is persistently stored. The policy grapples with the issue of whether or not to save state created by untrusted code and if so, whether the state should be stored in an isolated manner or merged back into the main file system of the computer. On one hand, to provide a convenient user experience, it may be helpful to persistently store cookies for a web site. On the other hand, it would not be desirable to persistent malicious code, such as a key logger, that was inadvertently introduced into a virtual machine by malware downloaded into and run in the affected virtual machine.

The persistence policy, hand in hand with the placement policy, should be designed to ensure that any potentially malicious code is not persistently stored, or in the alternative, persistently stored in an isolated way. This way, if malicious code, such as a key logger, is persistently stored, and in any future invocation (execution or interpretation), it is invoked (executed) in the context of a possibly new virtual machine instance separate from any other code, thereby nullifying the risk presented thereby.

To illustrate an illustrative persistence policy, in an embodiment only cookies and cache files are persistently stored in a virtual machine in which a web browser executes. Further, the cookies and cache files associated with a particular web site are only inserted to a virtual machine that is intended to execute a web browser displaying that web site. Thus, cookies and a cache file associated with site A would not be inserted into a virtual machine instantiated to run a web browser to display web site B, but would be inserted into a virtual machine instantiated to run a web browser to display web site A.

The above discussion of a persistence policy is exemplary of certain embodiments and is not intended to describe all implementations of a persistence policy, as a persistence policy will be configured based upon the particular needs and concerns of the end user.

Unified Display

Even though there may be a plurality of virtual machines executing at the client, this complexity need not be exposed to the end user of the client. Thus, the end user should be presented visual content generated from each virtual machine executing on the client in a unified manner to present a single, cohesive presentation to the end user of the client. The presentation of the content should be seamless and close to native as possible.

For example, the end user of the client should interact with a web browser that looks like a known web browser, even though the web browser, at the back end, is implemented using a plurality of virtual machines to execute copies of the web browser and different web pages corresponding to each tab of the web browser.

Virtual Machine Forensics and Malware Detection

In an embodiment of the invention, the execution of a process within a VM may be monitored, and when a trigger event occurs (e.g., the process deviates from expected behavior), additional monitoring is initiated. Such additional monitoring may include storing data (termed "behavior data") which describes the real-time events taking place inside the VM. This "behavior data" may then be compared to information about the expected behavior of that type of process to determine whether malware has compromised the VM. The behavior data may describe a sequence of actions performed by the process, and this sequence of actions may be compared to the information about the expected behavior to determine whether the behavior of the process executing within the virtual machine is progressing in a normal or deviant manner.

Figure 6:
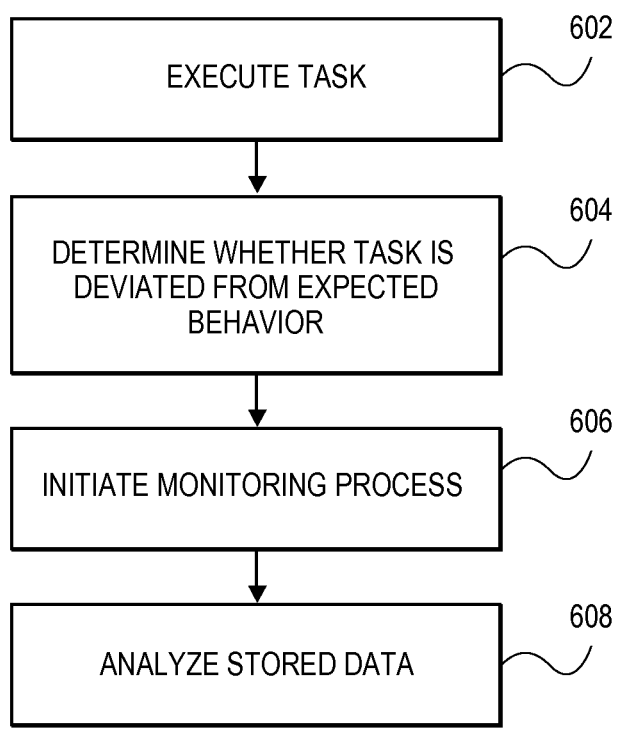
FIG. 6 is a flowchart of the steps involved in virtual machine forensics and detection according to an embodiment.

FIG. 6 is a flowchart showing an example process 600 of the steps involved in virtual machine forensics and detection according to an embodiment. Process 600 may be implemented by code executing on client 100 of FIG. 1, such as code residing in hypervisor 110 or in a virtual machine, such as VM0 130 or a UCVM 160, or in a different module, such as module 136.

In step 602, a VM is instantiated in response to the creation of a particular process. As described earlier, there may be any number of processes executing in parallel on a client, and any number of processes may execute in a separate VM. When a process is initiated to perform a task, a virtual machine may be instantiated dynamically using a template virtual machine associated with that type of task, and the process may execute within the newly instantiated virtual machine.

In step 604, a determination is made as to whether the actual behavior of the process during execution has deviated from the expected behavior. For example, a PDF document should not attempt to connect to a remote entity via a network connection, and so if this activity is detected, then it is considered to deviate from the expected behavior for that type of file.

In an embodiment, the determination of step 604 may be made using a multi-tiered analytical approach. Various modules executing at different levels of the system may detect behaviors that indicate a potential exploit or malicious attack, and may initiate a monitoring process on the process if deviant behavior is observed. As an example, an illustrative module of the multi-tiered approach is a user-level module (e.g., a driver) that detects activity occurring at the user layer of the particular VM's operating system.

To illustrate, a process may attempt to perform a suspicious action, such as an attempt to download or "drop" one or more files into the OS file system, an attempt to open a network connection (e.g., HTTP or FTP), an attempt to execute code, an attempt to modify user-layer portions of the registry, or an attempt to disable a firewall. User-level modules (drivers) within the multi-tiered approach may contain programming hooks that enable the inspection of communications between various components and/or modules. There may be user mode hooks enabling the inspection of API calls to the operating system along with registry activity, kernel mode hooks enabling the analysis of kernel activity, file system hooks and network hooks to analyze and/or log all network traffic. These hooks allow the determination whether prohibited activity (such as privilege escalations, which are utilized by malware to persist on a system is occurring.

In an example embodiment, the hooks, or similar interconnections between modules, facilitate the gathering of information. The gathered information is subsequently analyzed to determine whether a particular action or occurrence is the system is the result of malware compromising the system. This behavior-based detection inside the guest operating system is based on storing and analyzing information about activity occurring in the micro-VM.

Due to the focused nature of the VM, the step of determining whether a process deviates from expected behavior may be more easily accomplished. This is so because all activity occurring within the VM should be directed towards the achievement of the particular task for which the VM was instantiated. For example, if a process executing within a VM is responsible for providing the content associated with a single tab of a web browser, then actions which are nonstandard for that type of activity performed that are performed by that process may be identified. Thus, if a process responsible for retrieving a web page performs an action not associated with retrieving a web page, such as spawning one or more child processes, attempting to modify the registry, or attempting to disable a firewall, these actions may be identified as deviant behavior.

As another example of a multi-tiered approach, a kernel-level module (e.g., a driver) may detect activity occurring at the kernel layer of the particular VM's operating system. For example, a kernel-level module may detect deviant behavior of a process by detecting that a process performs certain action uncharacteristic for the type of task for which it is assigned, such as a process that attempts to create a process, a process that attempts to modify a kernel-layer portion of the registry, a process that attempts to modify an access control list, or a process that attempts to kill another process.

As another example of a multi-tiered approach, a hypervisor-level module (e.g., a driver) may detect deviant behavior of a process by detecting that a process performs certain actions uncharacteristic for the type of task for which it is assigned occurring at the hypervisor layer of the client, such as an attempt to modify page tables, an attempt to access CPU registers, an attempt to modify the BIOS, or an attempt to overwrite the Master Boot Records.

In an embodiment, configurable rules are stored, for example on the host in an XML file, which relate to the behaviors described above, and in an embodiment are specific to each document MIME type. These rules may be set by a user (e.g., an administrator) in a configuration module. These rules, after considering the behavior of a process, may result in a variety of different outcomes, e.g., the behavior in question may be allowed or denied or the VM may be instructed to cease execution.

For example, a user may define a rule that if a registry access is attempted in a VM, then the VM should be stopped. Other, more permissive rules may be utilized as well; for example, if a user desires to gather as much data about potential exploits as possible, then she may configure rules that allow most behaviors to allow the process to run for a longer period within the virtual machine so that additional behavior may be analyzed.

In step 606, if it has been determined that a particular process has deviated from expected behavior, then a monitoring process is initiated. This monitoring process may be initiated by an Inspection module. By only beginning to monitor processes after a potential exploit has been identified as potentially active, overhead to the system is avoided. Additionally, because of the isolation afforded by the single process/single VM approach, identified malware may be allowed to continue executing so that data related to the malware and the affected process may be stored for later forensic analysis, as will be discussed herein.

In an embodiment, the monitoring process includes storing behavior data which describes the potentially affected process and the effects of the potential exploit. In an embodiment, behavior data may comprise a "snapshot" of the VM taken at varying times; for example, the snapshot may comprise data describing the state of the process and the VM, such as all the changes inside the UCVM including file system, memory, registry, network, etc. In an embodiment, this snapshot comprises a succession of "diffs" (that is, data that describes the difference between states) between states of the system at various points in time that encompass all the changes that have occurred within the micro-VM. Behavior data may, but need not, comprise registry accesses, memory contents, file system modifications, and so on. Example embodiments embed the executable, DLL, or other file(s) that are identified (for example, by an analysis engine) as comprising the malware either within the data comprising the snapshot or elsewhere. By so doing, the particular environment in which the malware operates may be identified. In an embodiment, behavior may be stored on the host operating system.

Example embodiments, in addition to the snapshots or as part of them, continue to record every aspect of the potential malware and the interaction between it and the VM, such as registry accesses, memory stores, network access (e.g., ports opened), processes created and killed, etc. This data and the snapshots provide data which, along with data relating to the system clock, may later be used to "replay" the attack, as discussed more fully herein.

In an embodiment, the storage requirements of this data and/or snapshots may be minimized because only a single process is being monitored in the virtualized environment, not an entire operating system with its multitude of overlapping and interrelated processes. In an example approach, the data stored may be encrypted such that only a limited number of people may access it.

In step 608, at least a portion of the data stored about the potentially affected process and the effects of the potential exploit is analyzed to determine whether in fact the process has been compromised by malware. An example embodiment examines the behavior of the process running inside the micro-VM. For example, if the process dropped and executed a DLL file inside the UCVM and then invoked ftp.exe, then this behavior would be recognized as being suspicious behavior. After a detection of "dropping and executing" (which is a typical first phase of infection), an embodiment will invoke a tracing technique in which the entire execution trace of the malware is recorded. A graphical user interface (GUI) may be used to visually highlight the malicious aspect and enable the viewer to drill down and view additional details about each step along the way, as discussed more fully below in the next section.

In some implementations, process 600 can include fewer, additional and/or different operations. In other examples, only one or some subset of these operations may be included, as each operation may stand alone, or may be provided in some different order other than that shown in FIG. 6. For example, in an embodiment, steps 604 and 606 may be performed in parallel if sufficient resources are available.

Malware Forensics Graph

According to an embodiment, the behavior data stored (e.g., as part of the monitoring approach described in the previous section) describing the affected process, the potential malware and the status of the VM may be utilized to create and populate a graph or mapping that shows the activities occurring around the potential exploit. In one example, the behavior data stored is sufficient to allow a malware attack to be "replayed" in a graphical manner similar to replaying a video of an event.

Figure 7:
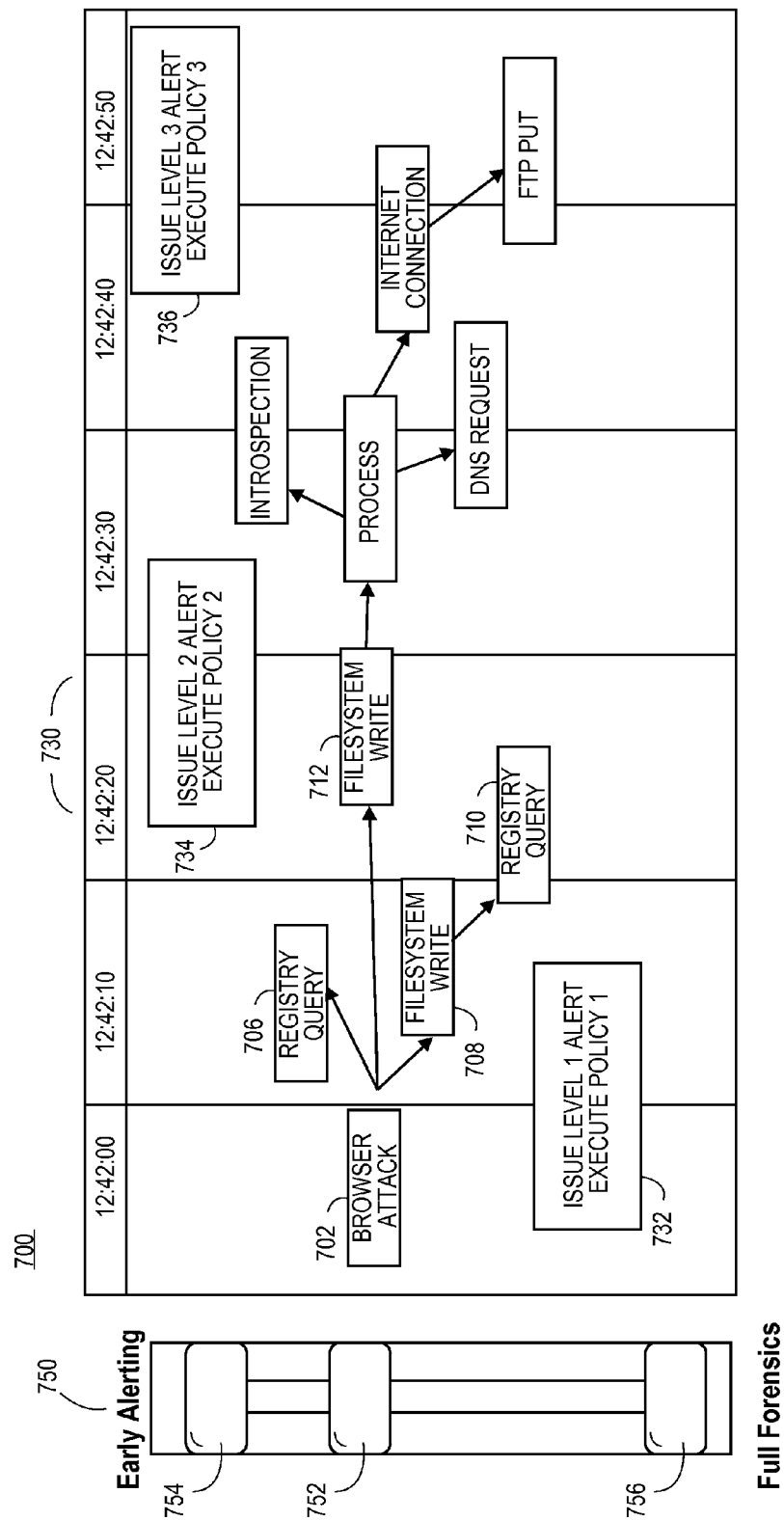
FIG. 7 is an illustration of a graphical user interface depicting a process flow graph of a potential exploit according to an embodiment.

FIG. 7 is an illustration of a graphical user interface depicting a process flow graph 700 of a potential exploit according to an embodiment. The process flow graph 700 may be, but need not be, generated in real time as all the volatile and non-volatile information related to the potential malware attack is saved. Volatile information may include data such as memory accesses and values stored in memory, CPU register accesses, and so on. Non-volatile information may include data that is stored on the client, for example in the file system of the OS executing in the VM. Examples may be files that are "dropped" by an exploit or activities that are captured in a log written to a file system. By storing this information as the malware is populating, the attack may be traced and replayed back at a later time.

As a result of monitoring the behavior of entities executing in the VM and storing data as described earlier, time-based nodes 702-712 may be created in graph 700 where the nodes 702-712 represent activity that has been monitored and data describing the activity stored and analyzed. The nodes may be correlated to time by storing the time on the client's system clock when the activity was monitored. Correlating the activities with the time on a system clock allows the malware attack to be replayed as it occurred on the client.

In FIG. 7, sample node 702 is generated based on an event, e.g., the earliest activity monitored on client 100 after a process has been determined to deviate from expected behavior. In this example, node 702 comprises a "behavior profile" which describes the nature of the exploit along with related data. In this example, node 702 reflects the determination that this is a "Browser Attack." In some embodiments, the logo of the application being monitored is displayed for ease of identification. Along with the type of attack, node 702 may display additional information of the profile such as the process name that is implicated in the activity represented by node 702. Other information which may be displayed by a node includes information about registry keys, file system locations, and the like. The time of the identification may be displayed, for example based on the system clock. Information related to the event represented by the node that is not displayed (for example, certain information may not be displayed to save space) may be displayed by other means, such as double-clicking the node, moving a mouse pointer over the node, or designating a separate part of the graph to display the information when the node is selected. This information may comprise any and all data stored that is related to the event or the system at the time of the event, such as CPU ID implicated, whether the VMX instruction is enabled, etc.

A severity of the activity may be displayed to the viewer using different mechanisms. For example, the severity of the activity represented by a node may be indicated using text, graphics, or depicting the node in a particular color. The severity may be determined using different approaches across embodiments. In one embodiment, the severity of an activity represented by a node may be ascertained using a combination of predetermined conditions that are deemed to be malicious and by correlating multiple chains of events. These levels of severity may be defined by a user and stored in a configuration file, or may be classified based upon a combination of information, such as whether the file system was written to, whether the MBR/VBR was modified, etc. The configuration file may indicate certain conditions that represent a high level of severity, e.g., the configuration file may indicate that if a certain filename writes to a particular section of the file system and thereafter opens a network connection, then a high level of severity is warranted.

Nodes 702-712 may be predefined or generated dynamically in response to the monitoring and analyzing steps. While all nodes of graph 700 may be dynamically created based upon observed behavior occurring within the VM, certain conditions, which when detected, may result in the creation of one or more predefined nodes that are always created when the certain conditions are detected. In an example, if a drop and file system write operation is observed followed by the dropped file attempting to create a process through an API call, then a particular predefined node may be created based upon that identified behavior.

The dynamically generated nodes may be based on prerequisites that are behaviorally based, such as a PDF document attempting to connect to a network or attempting to manipulate the master boot record (MBR). Turning back to FIG. 7, after the event correlated with node 702, the monitoring approach captured a registry query event that is unexpected, and a node 706 is created in response. If this particular registry query is predefined in a database (e.g., the specific query to a specific portion of the registry is already known), then the node may be populated with certain predefined information. If this particular registry query event is not located in a database, then the node is dynamically generated based on the data associated with the event. In the case of node 706, the information displayed includes the type of event (registry query) and the affected location along with the date and time, although other information may also be displayed as discussed earlier.

Other events in the current example generate additional nodes. After the observance of the registry query represented by the registry query node 706, a file system write event was monitored and a corresponding node 708 created, followed by the observance of another registry query event represented by node 710, which was followed by the observance of another file system write event represented by node 712. The nodes 702-712 are plotted on a horizontal axis 730 based on time as determined by the system clock as described earlier.

While these nodes represent individual events monitored as a result of detecting unexpected behavior, in the case of sophisticated malware, there may be hundreds, even thousands of such events, and they may happen with such rapidity that a graph of the events would be difficult to review because of the visual noise created by so many nodes with detailed information. In an embodiment, a pattern of events may be treated as a single event and a series of events may be interpreted as a single event. Multiple events may be represented as a single node (an "UI correlation node"), which may lead to another node that is also representative of multiple events.

In an embodiment, this is accomplished by comparing a series of nodes to information about known malware and how that known malware operates. In an example, a UI correlation node will encompass the previous and next nodes and will correlate based on the type/category of node. It may also correlate based on count; for example, a node with multiple similar outbound nodes can be correlated into a single node.

In an embodiment, multiple events may be correlated based on the type and/or category, and visually combined or collapsed into a single node (or state) in a way that provides effective commentary on what the collection of events means. In FIG. 7, reference may be made to a database of known malware events to determine that the events represented by nodes 702-712 are part of a known sequence of events. In response, one embodiment collapses nodes 702-712 into a single node. A sequence of collapsed nodes is envisioned in an example. In one example, the collapsed node may be double-clicked or otherwise operated on to expand the collapsed node into the multiple nodes represented thereby. In an example, a node with multiple similar outbound nodes can be combined into a single node.

While certain states (i.e., collections of events represented by nodes) may be predetermined, in other example embodiments the states may be dynamically organized based on behavior. Reference may be made to a collection of data to determine that certain collections of events represent malware-related behavior. For example, there may be a file system write event in which a temporary file is dropped into a particular directory, then the temporary file is attempted to be loaded as a kernel driver, then a network socket is opened on a particular port. While these are all separate events and may be represented by individual nodes, each with its own severity and collection of information about the events, instead the collection of events may be represented by a single node based on a dynamic evaluation of the collection of behaviors. Through this example approach, a collection of events may be assigned a severity and malware may be identified in a more granular fashion with a particular confidence level.

In an example, various "confidence levels" may be defined by policy. These policies may be editable by personal having appropriate access privileges, for example an administrator. An example policy may allow the assigning of various confidence levels to certain types of events. For example, a policy may indicate that when a "drop and execute" event is detected by the forensics techniques described herein, that a particular confidence level (e.g., "high", "medium", "low") may be assigned to the event. Other policies may then be implemented to take action based upon the detection of an event of a particular confidence level. For example, if an event occurs that is associated with a "high" confidence level, then an action such as stopping the VM may be performed.

In an embodiment, policies defining confidence levels and the responses thereto are defined in an XML file. For example, a list of behaviors (e.g., dropping of malware, file system write, attempted escalation of privilege, network activity) may be defined along with the action to be taken (e.g., stop VM, halt network traffic to the VM, deny API calls, etc.). Various users may want to take different actions based on the detected confidence level of an event. For example, a standard user may want to take full advantage of the protection offered by the techniques described herein and stop the VM at the first detection of a high confidence event (as defined by policy). On the other hand, an administrator may wish to be notified that an event occurs of any confidence level so that the administrator can observe the malware infection in real time to see what happens.

In one example, a user interface element such as a policy editor 750 may be implemented to select a particular level of protection. While a policy editor 750 is depicted in FIG. 7, it is understood that any type of user interface element may be utilized, as well as a direct selection of a level of protection; for example, by typing in a numeric percentage in a dialog box or in a configuration file. In the policy editor example, a user may adjust a slider bar 752 on a range between "early alerting" 754, which would for example immediately stop the VM (or deny API calls, or deny network traffic, etc.) at the first detection of an event of a particular confidence (again, which may be defined by policy, such as by an administrator editing an XML file), and "full forensics" 756, which would alert the user of an event of a particular confidence level and gather the entire attack cycle for further analysis. In this example, the policy editor 750 is a manifestation of different policies that may be defined and acted upon based upon events detected via the techniques described herein. Each policy will have its own settings (e.g., per node) and have actions like "ALLOW", "DENY", "STOP VM".

In an example embodiment, the data used to create the nodes may be used to step backwards and forwards in time to recreate the graph 700 to observe the activities and map out the lifecycle of particular malware in a reliable manner. In an example, controls will be provided to allow the "playing" of the VM; for example, a slider may be manipulated to go to a point in time where the VM was not compromised, and then a "play" button may be activated so the nodes are created as if watching a movie. The node creation and mapping may be stepped through to observe what happened and when. If the data is encrypted as described earlier, example embodiments may restrict the viewing of the graph and the potential "playback" to certain personnel having sufficient access credentials.

In an embodiment, the particular events comprising the graph of nodes may be utilized to create a "fingerprint" of the phases of the malware, or the "map" of the malware. The fingerprint of the states may be created using a hash function or similar approach known in the art, such as XML. In an example embodiment, this fingerprint may be created on-the-fly as the malware infection is occurring, and the characteristics embodied by the fingerprint may be sent to a central database. The central database may then compare the fingerprint to data about fingerprints taken from other malware behavior from prior infections. In an example based upon FIG. 7, a fingerprint of nodes 702-712 may be created and sent to a central location for comparison with fingerprints created from maps of nodes resulting from known malware infections. If a match is detected, then notification may be transmitted from the comparison location (e.g., a server) back to the forensics engine and an alert 732 may be displayed or other action taken depending on what policies have been defined.

Malware Determination Heuristics

Example embodiments utilize heuristic techniques in order to determine whether a process executing in a VM is exhibiting behavior that may be characterized as abnormal or unexpected. This behavior may be considered in one embodiment as a "trigger event." As a result of determining a trigger event (e.g., the process deviates from expected behavior), additional monitoring is initiated, including storing data about the real-time events taking place inside the VM.

A heuristic or set of heuristics may comprise an algorithm that is determined, at least in part, from observation of existing applications as well as malware implementations. Data collected from the observation may be analyzed, indexed, and stored in a database, which database is then used to define "normal" or expected behavior for a process associated with an application.

The heuristics of example approaches comprise a combination of certain events that taken together are reliable enough to label particular behavior as unexpected. Examples may comprise a particular process attempting to spawn a child process, or if a Java process attempts to invoke particular APIs. The heuristics may be predefined so that activity from a process may be compared to a set or subset of predefined heuristics.

According to an embodiment, the approaches described herein, such as the various examples of heuristics, as well as other approaches, are envisioned as being performed in the context of a host executing at least one micro-virtual machine (micro-VMs). In a micro-VM, instead of virtualizing multiple operating systems, the micro-VM (via a micro hypervisor or microvisor) isolates (via hardware and/or software) each application task within a single running OS in a lightweight micro-VM. In an embodiment, a microvisor uses hardware virtualization to guarantee that micro-VMs are isolated from the host OS and each other. In this way, each untrustworthy task is automatically, instantly and invisibly isolated within a tiny micro-VM that has no access to enterprise data or networks, and which cannot modify the desktop. In one embodiment, a group of micro-VMs may be a plurality of virtual machines executing in a computing environment, wherein each task executes in a separate virtual machine instantiated for the particular task.

Figure 8:
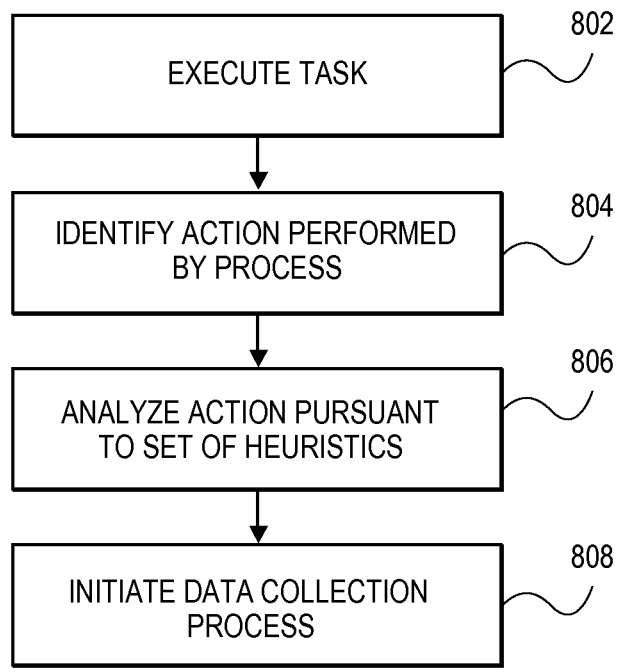
FIG. 8 is a flowchart illustrating the steps of virtual machine forensics and detection according to an embodiment.

FIG. 8 is a flowchart 800 illustrating the steps of virtual machine forensics and detection according to an embodiment. The steps of flowchart 800 may be performed by code executing on client 100 of FIG. 1, such as in the hypervisor 110 or a virtual machine such as VM0 130 or a UCVM 160, or by a different module or system.

At 802, a VM is instantiated in response to the creation of a particular process. As described earlier, there may be any number of processes executing in parallel on client 100, and each process may execute in a separate VM.

At 804, an action performed by a process executing in a VM is identified. For example, a kernel-level module may monitor a list of processes in order to determine when a new process is initiated, along with accessing and storing information about the process (e.g., creator, ID, etc.). A user-level module may also monitor the status of various events occurring in an OS executing in a VM, and a hypervisor-level module may monitor the status of various events occurring at the VM level.

At 806, the action identified in step 804 is analyzed in relation to a particular set of heuristics to determine whether a "trigger event" has occurred. To illustrate one example of heuristic techniques, assume a PDF file is opened in a VM. As described earlier, various modules perform background monitoring tasks, and in this example, the kernel-level module monitors the "Acrobat" process spawned when the PDF file was opened. The kernel-level module also monitors and child processes started by "Acrobat" and stores data describing a list of files that the parent "Acrobat" process (and any child processes) modifies along with a list of any drivers/services/etc. installed by the process or processes. In this example, "Acrobat" drops a file and starts it as a new process.

As a result of the background monitoring, two sets of information have been created. First, a set of modified files, and second, a set of files started as a process. By taking the intersections of the two sets, a list of files that have been dropped and started as processes is generated. The intersection may be considered as a list of static entries, out of which a certain number have become "active." This intersection provides a determination of a set of files that have been dropped by the potential exploit. Using a similar approach, malware that has been added to the registry may be detected using similar intersection logic.

At step 808, in response to the trigger event, a heightened monitoring process, in some embodiments comprising a data collection process, is initiated. Various other embodiments of heuristics may be utilized. In one example, malware is identified as it attempts to inject code into a currently-executing process inside the virtual machine, for example by the various modules performing background monitoring tasks as described above. This may occur when malware attempts to persist by injecting code into a new browser tab process after the malware has compromised the system.

Another heuristic which may be used by an embodiment is detecting when a file that has been modified attempts to invoke an executable. In one embodiment, there may be specified an amount of time between the modification and the attempt to invoke the executable wherein the heuristic is triggered; otherwise, no action is taken.

Another heuristic which may be used by an embodiment is identifying an attempt to load a modified DLL or system file, for example by malware in a post-exploitation phase. In one embodiment, there may be specified an amount of time between the modification and the attempt to load the file wherein the heuristic is triggered; otherwise, no action is taken.

Another heuristic which may be used by an embodiment is detecting an attempt by an executing process to modify (e.g., overwrite) a master boot record (MBR) and/or volume boot record (VBR).

Another heuristic which may be used by an embodiment is detecting an attempt by malware to drop a file (such as an executable, a system file, a DLL, and the like) and then delete itself. The malware may comprise an executable or other file, for example a downloaded program. This malware entity executes, performs a task such as dropping one of the aforementioned types of files, and then attempts to delete itself to avoid detection by virus scanners and the like.

Another heuristic which may be used by an embodiment is detecting and logging network communications. The type of network communication may be specified, for example by a configuration file or other indicator in a database. Various types of network activity may be only in- or out-bound requests, DNS requests (e.g., to particular DNS servers or to a defined class of DNS servers such as all within a particular country), the IP address of an entity sending in-bound data over the network, a particular network port being opened or used for communication, and a specific protocol being utilized, such as HTTPS or FTP.

Another heuristic which may be used by an embodiment is detecting an attempt to access or change the kernel memory of a guest operating system executing in a virtual machine. In one example, the kernel memory has been made immutable.

Another heuristic which may be used by an embodiment is detecting an attempt to access Windows tokens. Another example heuristic is detecting an attempt by malware to enumerate processes and/or drivers executing inside a virtual machine. This is commonly used by malware to identify targets for attacks.

Another heuristic which may be used by an embodiment is detecting an attempt by a executing task to access a physical drive to which the executing task has write permissions, such as a hard drive, DVD drive, or solid state drive. For example, a drive with a mount point such as \Device\Harddisk0\Dr0.

Another heuristic which may be used by an embodiment is detecting an attempt to load a driver inside a virtual machine. Another example heuristic is detecting an attempt to clear system logs; for example, Windows event logs.

Another heuristic which may be used by an embodiment is detecting an attempt to change the CR0 WP flag, or its equivalent. The CR0 control register in the x86 series of processors has various control flags that modify the basic operation of the processor. One of the flags concerns determines whether the CPU can write to pages marked read-only. Kernel mode Malware needs to change this flag to make pages writable to execute code and thereby overwrite operating system data structures.

Another heuristic which may be used by an embodiment is detecting whether a process has accessed registers being utilized by a virtualized system. This is necessary for some virtualized rootkits to take control of a machine by migrating the running operating system into a virtual machine.

Another heuristic which may be used by an embodiment is detecting whether a file infector has been dropped inside the UCVM. In one example, this is performed by identifying the type of files being modified in a given system after the introduction of a particular suspected file (e.g., a suspected malware dropper) and determining what percentage of those altered files are of a certain type; for example, executables or DLLs. If a threshold percentage of files that are modified are of a particular type (e.g., either DLLs/EXEs), then the suspected file is classified as PE infector. This threshold percentage may be dynamically calculated based upon an acceptable level of threat, as described earlier, or may be predetermined by a user or read from a configuration file.

Another heuristic which may be used by an embodiment is detecting an attempt to modify or manipulate a system service. In an example, malware may attempt to stop an anti-virus service or the firewall service.

Another heuristic which may be used by an embodiment is generating and storing hashes of all files that are newly created in the file system of the micro-VM, for example post-exploit by malware. In an example, once it has been determined that a process deviates from the expected behavior, all files created in the file system of the particular micro-VM are processed through a hashing function that creates a unique identifier for each such file, which is stored and can be used to identify the particular file. For example, the hash may be communicated to a database of hash values, and the identity and other details about the particular file, and thus the malware, may be deduced.

Supporting SMEP in a Virtualized Environment

Some, but not all, operating systems support the Supervisor Mode Execution Protection (SMEP) feature available in the Intel x86 architecture. In embodiments of the invention, a virtual machine may be instantiated executing a guest operating system that does not support SMEP; nevertheless, the virtualized environment of an embodiment may provide support for the virtual machine to support SMEP despite the guest operating system which executes therein lacking support for SMEP. In this way, the guest operating system may obtain the benefits of the SMEP feature provided by the hardware even though the guest operating system is not designed to make use of the SMEP feature.

Figure 9:
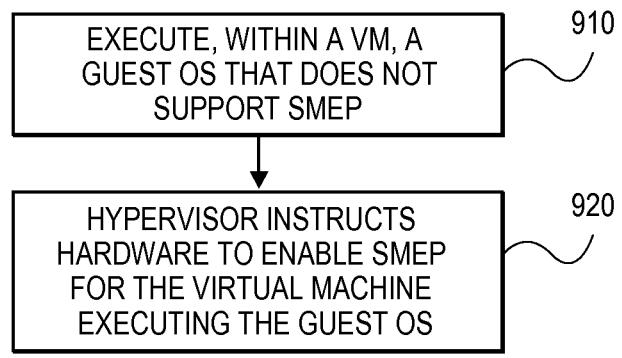
FIG. 9 is a flowchart illustrating the steps of supporting Supervisor Mode Execution Protection (SMEP) in a virtualized computing environment according to an embodiment of the invention.

FIG. 9 is a flowchart illustrating the steps of supporting Supervisor Mode Execution Protection (SMEP) in a virtualized computing environment according to an embodiment of the invention. In step 910, a guest operating system is executed within a virtual machine. For purposes of providing a concrete example, step 910 may be performed by executing guest operating system 162B within UCVM 162 as shown in FIG. 1. Guest operating system 162B does not support Supervisor Mode Execution Protection (SMEP). For example, guest operating system 162B may be, for example, the Microsoft Windows 7 operating system.

In step 920, hypervisor 120 instructs hardware 110 to enable SMEP for a particular virtual machine by setting the control register (CR4) appropriately. Continuing the above example, step 920 may be performed by hypervisor 120 instructing hardware 110 to turn on SMEP for UCVM 162. As a consequence, after hardware 110 turns on SMEP for UCVM 162, hypervisor 120 may be informed by hardware 110 of SMEP violations which occur within UCVM 162.

Note that the timing of when step 920 is performed may vary from embodiment to embodiment. For example, one embodiment may perform step 920 for a virtual machine as soon as possible after the virtual machine is instantiated. Other embodiments may perform step 920 for a virtual machine at some point after the virtual machine has been instantiated. In an embodiment, hypervisor 120 monitors accesses to the control register (CR4) which are performed by guest operating system 162B and thus ensure that SMEP remains enabled whilst UCVM 162 manipulates other bits in the control register. Hypervisor 120 may optionally be configured to hide, from UCVM 162, that SMEP is enabled for UCVM 162 by masking that SMEP is enabled for UCVM 162 from the control register when UCVM 162 reads the control register.

To illustrate how an embodiment of the invention may handle a SMEP violation, assume that, in the above example, guest operating system 162B enters supervisor mode (i.e., Ring 0). Guest operating system 162B, while in supervisor mode, instructs the CPU to execute code which resides in a portion of virtual memory accessible by "user space" (i.e., only the Ring 3 permission level is required to access this portion of memory), which results in a SMEP violation. Hypervisor 120 becomes informed of this SMEP violation by way of a page fault of a type that is configured to return execution to hypervisor 120.

In an embodiment, upon hypervisor 120 being notified that hardware 110 detected that guest operating system 162B has instructed the CPU to execute code stored in virtual memory accessible by user space while the CPU is in supervisor mode, hypervisor 120 consults a policy to identify what, if any, responsive action hypervisor 120 should perform. The policy consulted by hypervisor 120 may be stored at or comprised within policy data 139.

The policy consulted by hypervisor 120 may instruct hypervisor 120 to take a variety of responsive actions. For example, the policy may indicate that hypervisor 120 should propagate a page fault to guest operating system 162B. Since guest operating system 162B does not natively support SMEP, when the page fault handler of guest operating system 162B receives the SMEP page fault, the page fault handler of guest operating system 162B will interpret the received SMEP page fault as a different type of page fault, namely that of an execute disable fault. When the page fault handler of guest operating system 162B receives the SMEP page fault (which it will interpret as a valid, but different type of page fault), the page fault handler of guest operating system 162B may cause guest operating system 162B to crash. Causing guest operating system 162B to crash in this instance is not undesirable, but instead, may be viewed as a safety feature, as there is no reason why code residing in user space should be executed in supervisor mode (Ring 0). Alternatively, guest operating system 162B may interpret the SMEP page fault as a spurious page fault (since guest operating system 162B cannot understand why the page fault might have occurred) and may simply retry the instruction, which will once again result in a page fault. Thus, guest operating system 162B may proceed to enter a loop in attempting to execute the instruction. Hypervisor 120 may sample periodically to determine whether this condition may be occurring, and hence identify that a SMEP fault is occurring and proceed to implement its configured policy.

Alternately, the policy consulted by hypervisor 120 may instruct hypervisor 120 to close virtual machine 162. Closing virtual machine 162 in this manner is again a safety feature, as there is no reason why code residing in user space should be executed in supervisor mode (Ring 0). Ceasing to maintain virtual machine 162 eliminates the risk posed by any malicious code contained therein.

The policy consulted by hypervisor 120 may instruct hypervisor 120 to suppress the generation of a SMEP page fault (which, in effect, turns off support for SMEP), allow guest operating system 162B to continue operation within virtual machine 162, and initiate forensic analysis upon virtual machine 162. The forensic analysis may be performed upon virtual machine 162 as described above with reference to step 606 of FIG. 6. In effect, once hypervisor 120 identifies that a SMEP violation has occurred within guest operating system 162B, hypervisor 120 determines that guest operating system 162B has deviated from the normal or expected behavior of a guest operating system and subsequently performs step 606 of FIG. 6 as described above. Such an embodiment may be useful in analyzing the behavior of malicious code and ensuring forensic analysis is initiated when appropriate.

Alternately, the policy consulted by hypervisor 120 may instruct hypervisor 120 to suppress the generation of a SMEP page fault (which, in effect, turns off support for SMEP) and emulate a successful performance of the instruction which caused the SMEP violation, allow guest operating system 162B to continue operation within virtual machine 162, and initiate forensic analysis upon virtual machine 162. As before, the forensic analysis may be performed upon virtual machine 162 as described above with reference to step 606 of FIG. 6. Such an embodiment may be useful in analyzing the behavior of code and ensuring forensic analysis is initiated when appropriate. This approach allows the behavior of the executing code to be observed as if the SMEP violation did not occur.

Hardware Mechanisms

Figure 10:
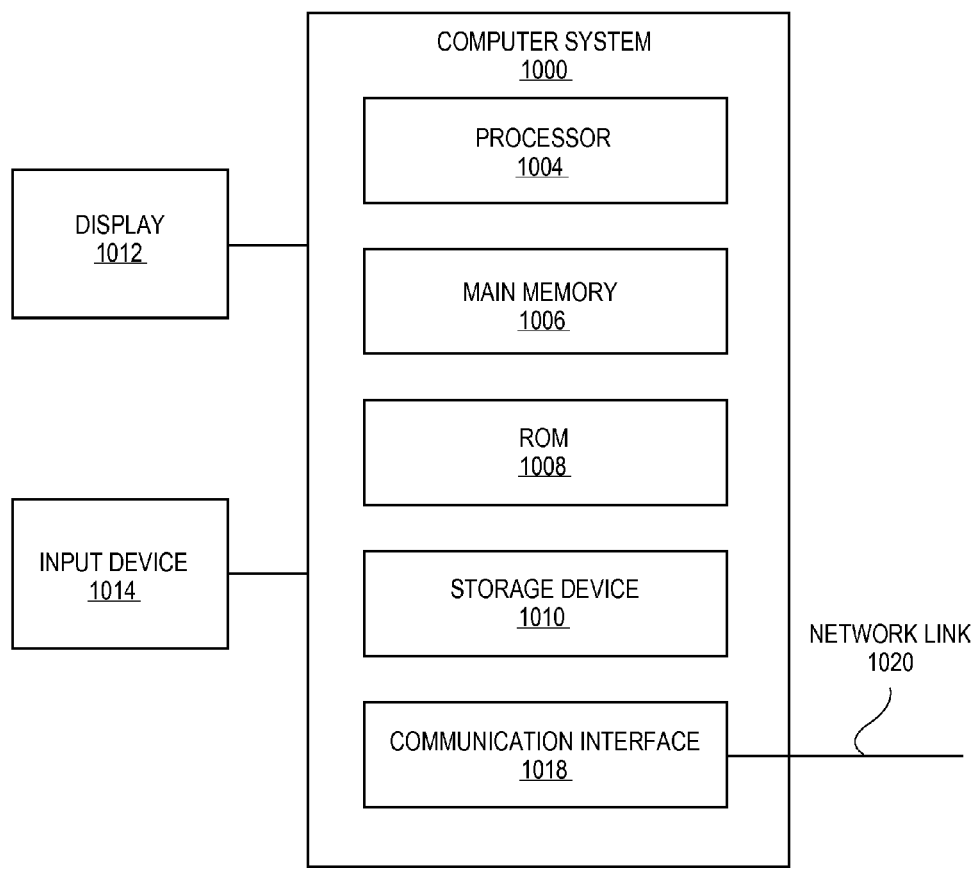
FIG. 10 is a block diagram that illustrates a computer system upon which an embodiment of the invention may be implemented.

In an embodiment, client 100 of FIG. 1 may be implemented on, include, or correspond to a computer system. FIG. 10 is a block diagram that illustrates a computer system 1000 upon which an embodiment of the invention may be implemented. In an embodiment, computer system 1000 includes processor 1004, main memory 1006, ROM 1008, storage device 1010, and communication interface 1018. Computer system 1000 includes at least one processor 1004 for processing information. Computer system 1000 also includes a main memory 1006, such as a random access memory (RAM) or other dynamic storage device, for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device for storing static information and instructions for processor 1004. A storage device 1010, such as a magnetic disk or optical disk, is provided for storing information and instructions.

Computer system 1000 may be coupled to a display 1012, such as a cathode ray tube (CRT), a LCD monitor, and a television set, for displaying information to a user. An input device 1014, including alphanumeric and other keys, is coupled to computer system 1000 for communicating information and command selections to processor 1004. Other non-limiting, illustrative examples of input device 1014 include a mouse, a trackball, or cursor direction keys for communicating direction information and command selections to processor 1004 and for controlling cursor movement on display 1012. While only one input device 1014 is depicted in FIG. 10, embodiments of the invention may include any number of input devices 1014 coupled to computer system 1000.

Embodiments of the invention are related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 1004 for execution. Such a medium may take many forms, including but not limited to, non-volatile media and volatile media. Non-volatile media includes, for example, optical or magnetic disks, such as storage device 1010. Volatile media includes dynamic memory, such as main memory 1006.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a network link 1020 to computer system 1000.

Communication interface 1018 provides a two-way data communication coupling to a network link 1020 that is connected to a local network. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through a local network to a host computer or to data equipment operated by an Internet Service Provider (ISP).

Computer system 1000 can send messages and receive data, including program code, through the network(s), network link 1020 and communication interface 1018. For example, a server might transmit a requested code for an application program through the Internet, a local ISP, a local network, subsequently to communication interface 1018. The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions, which when executed by one or more processors, cause:
   executing, within a virtual machine, a guest operating system which does not support Supervisor Mode Execution Protection (SMEP);
   a hypervisor instructing hardware to enable Supervisor Mode Execution Protection (SMEP) for the virtual machine executing the guest operating system;
   upon the hypervisor determining that the guest operating system has instructed a central processing unit (CPU) to execute code stored in virtual memory accessible by user space while the CPU is in supervisor mode, the hypervisor consulting a policy to determine whether to propagate a SMEP page fault to the guest operating system;
   upon the policy indicating that the SMEP page fault should be propagated, propagating the SMEP page fault to the guest operating system, wherein the page fault handler of guest operating system interprets the propagated SMEP page fault as a different type of page fault; and
   upon the policy indicating that the SMEP page fault should not be propagated, preventing the SMEP page fault from being propagated to the guest operating system,
   wherein the SMEP page fault is a page fault issued in response to execution of said faulting instruction at a higher privilege mode than required for accessing a virtual address at which said faulting instruction is stored.

2. The one or more non-transitory computer-readable storage mediums of claim 1, wherein the guest operating system is Microsoft Windows 7.

3. The one or more non-transitory computer-readable storage mediums of claim 1, wherein execution of the one or more sequences of instructions further causes:
   upon the hypervisor being notified that the hardware detected that the guest operating system has instructed a central processing unit (CPU) to execute code stored in virtual memory accessible by user space while the CPU is in supervisor mode, the hypervisor consulting a policy to identify what, if any, responsive action the hypervisor should perform.

4. The one or more non-transitory computer-readable storage mediums of claim 1, wherein execution of the one or more sequences of instructions further causes:
upon the hardware detecting that the guest operating system has instructed a central processing unit (CPU) to execute code stored in virtual memory accessible by user space while the CPU is in supervisor mode, the hypervisor allowing a page fault to propagate to the guest operating system to cause the guest operating system to crash.

5. The one or more non-transitory computer-readable storage mediums of claim 1, wherein execution of the one or more sequences of instructions further causes:
upon the hardware detecting that the guest operating system has instructed a central processing unit (CPU) to execute code stored in virtual memory accessible by user space while the CPU is in supervisor mode, the hypervisor allowing a page fault to propagate to the guest operating system to cause the guest operating system to loop attempting to execute the faulting instruction.

6. The one or more non-transitory computer-readable storage mediums of claim 1, wherein execution of the one or more sequences of instructions further causes:
upon the hypervisor being notified that the hardware detected that the guest operating system has instructed a central processing unit (CPU) to execute code stored in virtual memory accessible by user space while the CPU is in supervisor mode, the hypervisor terminating the virtual machine.

7. The one or more non-transitory computer-readable storage mediums of claim 1, wherein execution of the one or more sequences of instructions further causes:
upon the hypervisor being notified that the hardware detected that the guest operating system has instructed a central processing unit (CPU) to execute code stored in virtual memory accessible by user space while the CPU is in supervisor mode, the hypervisor (a) suppressing the page fault to prevent the page fault from being propagated to the guest operating system, (b) the hypervisor instructing the hardware to disable Supervisor Mode Execution Protection (SMEP) feature in the hardware for the guest operating system, and (c) continuing execution of the guest operating system and initiating forensic analysis upon activity performed within the virtual machine.

8. The one or more non-transitory computer-readable storage mediums of claim 1, wherein execution of the one or more sequences of instructions further causes:
upon the hypervisor being notified that the hardware detected that the guest operating system has instructed a central processing unit (CPU) to execute code stored in virtual memory accessible by user space while the CPU is in supervisor mode, the hypervisor (a) suppressing the page fault to prevent the page fault from being propagated to the guest operating system, (b) the hypervisor emulating a successful performance of the instruction which caused the central processing unit (CPU) to execute code stored in memory designated as user space while the CPU is in supervisor mode, and (c) initiating forensic analysis upon activity performed within the virtual machines.

9. An apparatus, comprising:
one or more processors; and
one or more computer-readable storage mediums storing one or more sequences of instructions, which when executed by the one or more processors, cause:
executing, within a virtual machine, a guest operating system which does not support Supervisor Mode Execution Protection (SMEP);
a hypervisor instructing hardware to enable Supervisor Mode Execution Protection (SMEP) for the virtual machine executing the guest operating system;
upon the hypervisor determining that the guest operating system has instructed a central processing unit (CPU) to execute code stored in virtual memory accessible by user space while the CPU is in supervisor mode, the hypervisor consulting a policy to determine whether to propagate a SMEP page fault to the guest operating system;
upon the policy indicating that the SMEP page fault should be propagated, propagating the SMEP page fault to the guest operating system, wherein the page fault handler of guest operating system interprets the propagated SMEP page fault as a different type of page fault; and
upon the policy indicating that the SMEP page fault should not be propagated, preventing the SMEP page fault from being propagated to the guest operating system,
wherein the SMEP page fault is a page fault issued in response to execution of said faulting instruction at a higher privilege mode than required for accessing a virtual address at which said faulting instruction is stored.

10. The apparatus of claim 9, wherein the guest operating system is Microsoft Windows 7.

11. The apparatus of claim 9, wherein execution of the one or more sequences of instructions further causes:
upon the hypervisor being notified that the hardware detected that the guest operating system has instructed a central processing unit (CPU) to execute code stored in virtual memory accessible by user space while the CPU is in supervisor mode, the hypervisor consulting a policy to identify what, if any, responsive action the hypervisor should perform.

12. The apparatus of claim 9, wherein execution of the one or more sequences of instructions further causes:
upon the hardware detecting that the guest operating system has instructed a central processing unit (CPU) to execute code stored in virtual memory accessible by user space while the CPU is in supervisor mode, the hypervisor allowing a page fault to be propagated to the guest operating system to cause the guest operating system to crash.

13. The apparatus of claim 9, wherein execution of the one or more sequences of instructions further causes:
upon the hardware detecting that the guest operating system has instructed a central processing unit (CPU) to execute code stored in virtual memory accessible by user space while the CPU is in supervisor mode, the hypervisor allowing a page fault to be propagated to the guest operating system to cause the guest operating system to loop attempting to execute the faulting instruction.

14. The apparatus of claim 9, wherein execution of the one or more sequences of instructions further causes:
upon the hypervisor being notified that the hardware detected that the guest operating system has instructed a central processing unit (CPU) to execute code stored in virtual memory accessible by user space while the CPU is in supervisor mode, the hypervisor terminating the virtual machine.

15. The apparatus of claim 9, wherein execution of the one or more sequences of instructions further causes:
upon the hypervisor being notified that the hardware detected that the guest operating system has instructed a central processing unit (CPU) to execute code stored in virtual memory accessible by user space while the CPU is in supervisor mode, the hypervisor (a) suppressing the page fault to prevent the page fault from being propagated to the guest operating system, (b) the hypervisor instructing the hardware to disable Supervisor Mode Execution Protection (SMEP) feature in the hardware for the guest operating system, and (c) continuing execution of the guest operating system and initiating forensic analysis upon activity performed within the virtual machine.

16. The apparatus of claim 9, wherein execution of the one or more sequences of instructions further causes:
upon the hypervisor being notified that the hardware detected that the guest operating system has instructed a central processing unit (CPU) to execute code stored in virtual memory accessible by user space while the CPU is in supervisor mode, the hypervisor (a) suppressing the page fault to prevent the page fault from being propagated to the guest operating system, (b) the hypervisor emulating a successful performance of the instruction which caused the central processing unit (CPU) to execute code stored in memory designated as user space while the CPU is in supervisor mode, and (c) initiating forensic analysis upon activity performed within the virtual machines.

17. A method, comprising:
executing, within a virtual machine, a guest operating system which does not support Supervisor Mode Execution Protection (SMEP);
a hypervisor instructing hardware to enable Supervisor Mode Execution Protection (SMEP) for the virtual machine executing the guest operating system;
upon the hypervisor determining that the guest operating system has instructed a central processing unit (CPU) to execute code stored in virtual memory accessible by user space while the CPU is in supervisor mode, the hypervisor consulting a policy to determine whether to propagate a SMEP page fault to the guest operating system;
upon the policy indicating that the SMEP page fault should be propagated, propagating the SMEP page fault to the guest operating system, wherein the page fault handler of guest operating system interprets the propagated SMEP page fault as a different type of page fault; and
upon the policy indicating that the SMEP page fault should not be propagated, preventing the SMEP page fault from being propagated to the guest operating system,
wherein the SMEP page fault is a page fault issued in response to execution of said faulting instruction at a higher privilege mode than required for accessing a virtual address at which said faulting instruction is stored.

18. The method of claim 17, wherein the guest operating system is Microsoft Windows 7.

19. The method of claim 17, wherein execution of the one or more sequences of instructions further causes:
upon the hypervisor being notified that the hardware detected that the guest operating system has instructed a central processing unit (CPU) to execute code stored in virtual memory accessible by user space while the CPU is in supervisor mode, the hypervisor consulting a policy to identify what, if any, responsive action the hypervisor should perform.

20. The method of claim 17, wherein execution of the one or more sequences of instructions further causes:
upon the hardware detecting that the guest operating system has instructed a central processing unit (CPU) to execute code stored in virtual memory accessible by user space while the CPU is in supervisor mode, the hypervisor allowing a page fault to be propagated to the guest operating system to cause the guest operating system to crash.

21. The method of claim 17, wherein execution of the one or more sequences of instructions further causes:
upon the hardware detecting that the guest operating system has instructed a central processing unit (CPU) to execute code stored in virtual memory accessible by user space while the CPU is in supervisor mode, the hypervisor allowing a page fault to be propagated to the guest operating system to cause the guest operating system to loop attempting to execute the faulting instruction.

22. The method of claim 17, wherein execution of the one or more sequences of instructions further causes:
upon the hypervisor being notified that the hardware detected that the guest operating system has instructed a central processing unit (CPU) to execute code stored in virtual memory accessible by user space while the CPU is in supervisor mode, the hypervisor terminating the virtual machine.

23. The method of claim 17, wherein execution of the one or more sequences of instructions further causes:
upon the hypervisor being notified that the hardware detected that the guest operating system has instructed a central processing unit (CPU) to execute code stored in virtual memory accessible by user space while the CPU is in supervisor mode, the hypervisor (a) suppressing the page fault to prevent the page fault from being propagated to the guest operating system, (b) the hypervisor instructing the hardware to disable Supervisor Mode Execution Protection (SMEP) feature in the hardware for the guest operating system, and (c) continuing execution of the guest operating system and initiating forensic analysis upon activity performed within the virtual machine.

24. The method of claim 17, wherein execution of the one or more sequences of instructions further causes:
upon the hypervisor being notified that the hardware detected that the guest operating system has instructed a central processing unit (CPU) to execute code stored in virtual memory accessible by user space while the CPU is in supervisor mode, the hypervisor (a) suppressing the page fault to prevent the page fault from being propagated to the guest operating system, (b) the hypervisor emulating a successful performance of the instruction which caused the central processing unit (CPU) to execute code stored in memory designated as user space while the CPU is in supervisor mode, and (c) initiating forensic analysis upon activity performed within the virtual machines.

* * * * *